(12) United States Patent
Sylvester et al.

(10) Patent No.: US 10,240,393 B2
(45) Date of Patent: Mar. 26, 2019

(54) THERMAL EXPANSION AND CONTRACTION SYSTEM

(71) Applicant: Panduit Corp., Tinley Park, IL (US)

(72) Inventors: David J. Sylvester, Manhattan, IL (US); Rodney G. Rouleau, Manhattan, IL (US); Samuel C. Ramey, Naperville, IL (US); Shaun P. Brouwer, St. John, IN (US); Scott K. Benedict, New Lenox, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 15/799,371

(22) Filed: Oct. 31, 2017

(65) Prior Publication Data
US 2018/0051514 A1 Feb. 22, 2018

Related U.S. Application Data

(63) Continuation of application No. 14/716,426, filed on May 19, 2015, now Pat. No. 9,810,021.

(60) Provisional application No. 62/005,281, filed on May 30, 2014.

(51) Int. Cl.
| | |
|---|---|
| *E06C 7/14* | (2006.01) |
| *H02G 3/32* | (2006.01) |
| *H02G 3/04* | (2006.01) |

(52) U.S. Cl.
CPC ............... *E06C 7/14* (2013.01); *H02G 3/32* (2013.01); *H02G 3/0456* (2013.01)

(58) Field of Classification Search
CPC .................. E06C 7/14; E16L 3/16; F16L 3/24
USPC ...... 248/77, 78, 210, 211, 214, 231.61, 238; 182/129
See application file for complete search history.

(56) References Cited

U.S. PATENT DOCUMENTS

| | | |
|---|---|---|
| 2,938,692 A | 5/1960 | Bosworth et al. |
| 3,023,989 A | 3/1962 | White |
| 3,680,817 A | 8/1972 | Gogan |
| 3,687,406 A | 8/1972 | Krahe et al. |
| 4,156,436 A | 5/1979 | Hawk |
| 4,232,845 A | 11/1980 | Turner |
| 4,319,724 A | 3/1982 | Bradbury |
| 4,369,945 A | 1/1983 | Mantoan et al. |
| 4,376,230 A | 3/1983 | Bargsten |
| 4,502,743 A | 3/1985 | Ziegler |
| 4,679,754 A | 7/1987 | Richards |
| 4,744,535 A | 5/1988 | Patenaude |

(Continued)

FOREIGN PATENT DOCUMENTS

| | | |
|---|---|---|
| DE | 3820290 A1 | 12/1989 |
| DE | 4234313 A1 | 4/1994 |

(Continued)

*Primary Examiner* — Gwendolyn W Baxter
(74) *Attorney, Agent, or Firm* — Christopher S. Clancy; James H. Williams; Aimee E. McVady

(57) ABSTRACT

A thermal expansion and contraction system secures cables to a ladder rung. The thermal expansion and contraction system includes a cable grip secured to the ladder rung. The cable grip includes a protective grommet for holding cables to the ladder rung, a metal plate and wire forms to secure the protective grommet to the metal plate. The thermal expansion and contraction system also includes a cable divider secured to the ladder rung to maintaining separation of cables and a cable containment clamp secured to the ladder rung.

7 Claims, 35 Drawing Sheets

(56) References Cited

U.S. PATENT DOCUMENTS

| | | |
|---|---|---|
| 4,802,643 A | 2/1989 | Uys |
| 5,014,940 A | 5/1991 | Sherman |
| 5,044,584 A | 9/1991 | Lin |
| 5,123,618 A | 6/1992 | Guterman et al. |
| 5,215,281 A | 6/1993 | Sherman |
| 5,465,929 A | 11/1995 | Dooley |
| 5,580,014 A | 12/1996 | Rinderer |
| 5,730,400 A | 3/1998 | Rinderer et al. |
| 5,969,292 A | 10/1999 | Snider, Jr. et al. |
| 5,992,802 A | 11/1999 | Campbell |
| 6,019,322 A | 2/2000 | Shimizu |
| 6,109,561 A | 8/2000 | Haines |
| 6,129,316 A | 10/2000 | Bauer |
| 6,155,741 A | 12/2000 | Took |
| 6,343,771 B1 | 2/2002 | Simon |
| 6,431,501 B1 | 8/2002 | Molek |
| 6,460,812 B1 | 10/2002 | Jette |
| 6,471,171 B1 | 10/2002 | VanderVelde |
| 6,483,026 B1 | 11/2002 | Snider, Jr. et al. |
| 6,729,585 B2 | 5/2004 | Ogden |
| 6,926,236 B2 | 8/2005 | Jette |
| 8,294,030 B2 | 10/2012 | Pollard, Jr. |
| 8,558,112 B2 | 10/2013 | Pawluk |
| 8,757,560 B2 | 6/2014 | Darnell |
| 9,309,719 B2 | 4/2016 | Sylvester et al. |
| 2006/0284027 A1 | 12/2006 | Smith et al. |
| 2011/0084179 A1 | 4/2011 | Wiedner et al. |
| 2011/0315829 A1* | 12/2011 | Darnell ............... H02G 3/0456 248/67.5 |
| 2012/0012715 A1 | 1/2012 | Andersen et al. |
| 2015/0144747 A1 | 5/2015 | Castellanos |

FOREIGN PATENT DOCUMENTS

| | | |
|---|---|---|
| DE | 202011050550 U1 | 10/2012 |
| EP | 1469249 A1 | 10/2004 |
| EP | 1641097 A1 | 3/2006 |
| GB | 2034795 A | 6/1980 |
| GB | 2469833 A | 3/2010 |
| JP | 63144707 A | 6/1988 |
| WO | 8804486 A1 | 6/1988 |
| WO | 9846921 A1 | 10/1988 |
| WO | 9910957 A1 | 3/1999 |

* cited by examiner

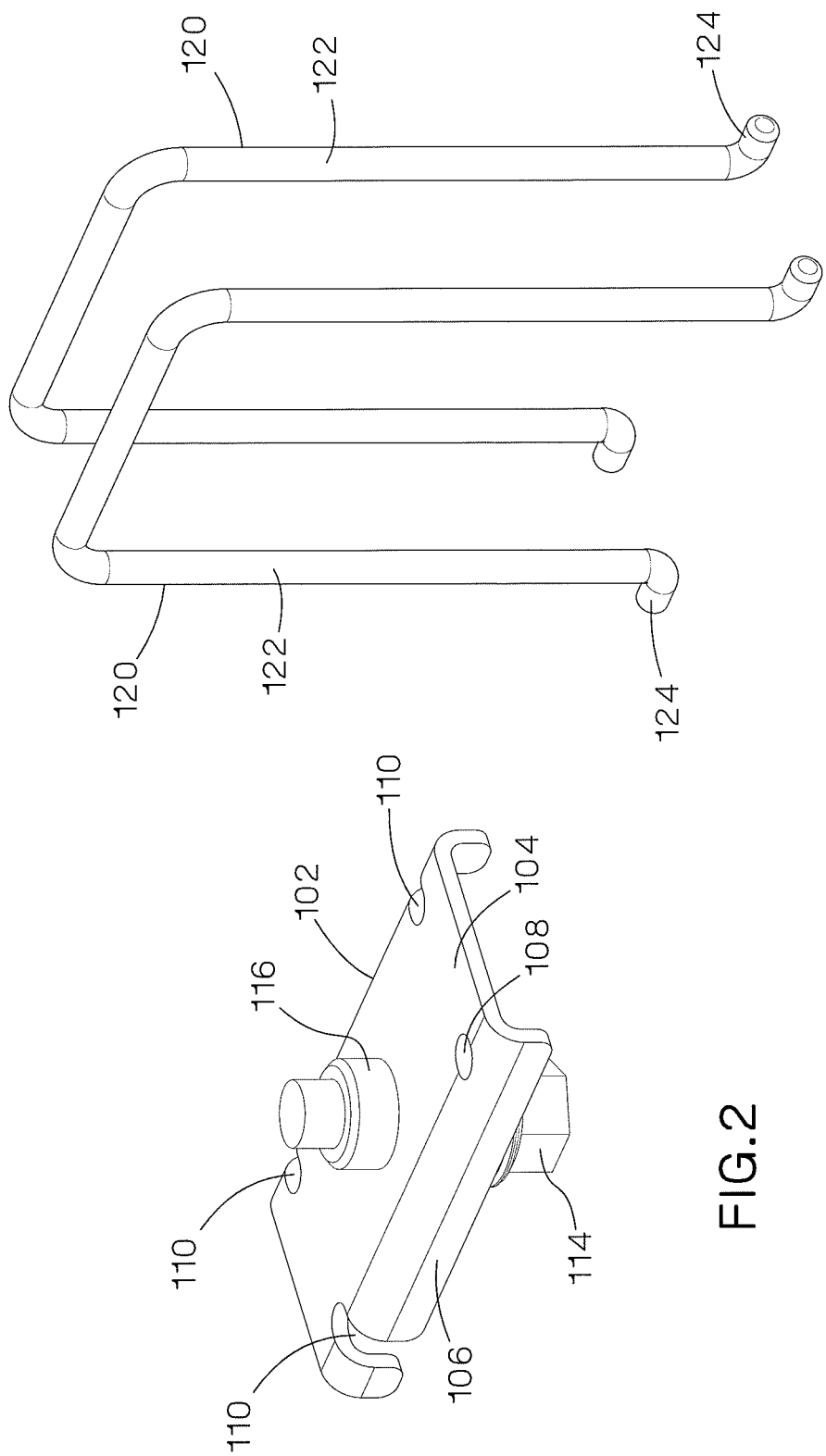

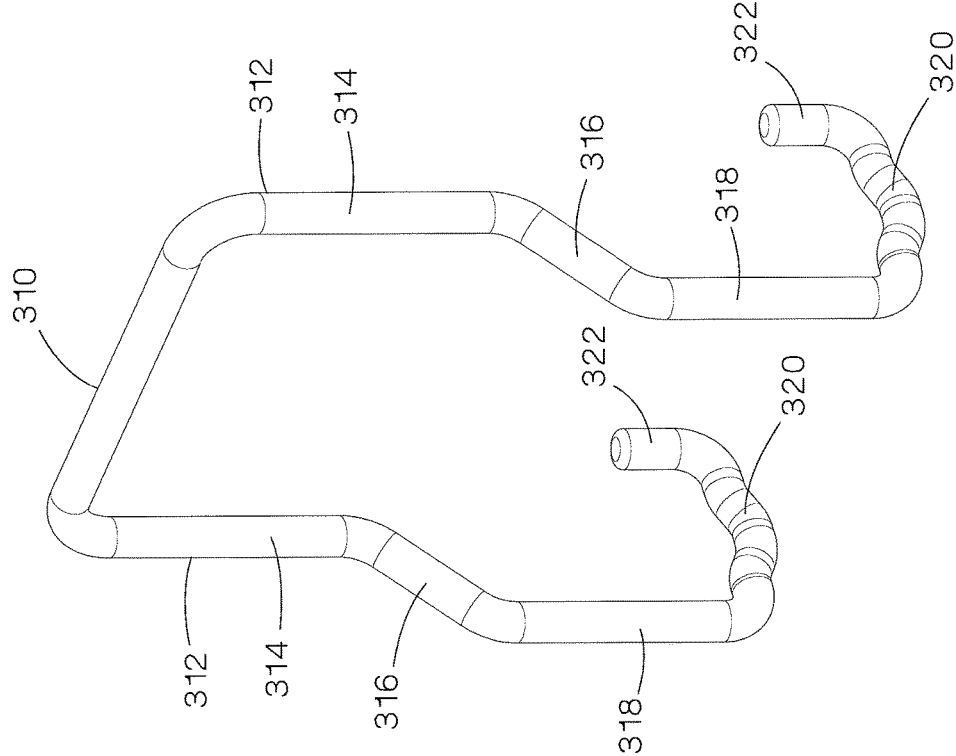
FIG.25
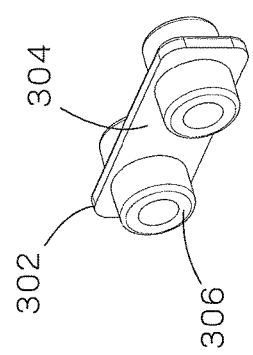
FIG.23
FIG.24

THERMAL EXPANSION AND CONTRACTION SYSTEM

CROSS REFERENCE TO RELATED APPLICATION

This application is a continuation of U.S. patent application Ser. No. 14/716,426, filed May 19, 2015, which will issue on Nov. 7, 2017, as U.S. Pat. No. 9,810,021; which claims priority to U.S. Provisional Application No. 62/005,281, filed May 30, 2014, the subject matter of which is hereby incorporated by reference in its entirety.

FIELD OF THE INVENTION

The present invention relates to securing cables to a ladder rung, and more particularly to a system that accommodates the thermal expansion and contraction of cables secured to a ladder rung.

BACKGROUND OF THE INVENTION

The normal operation of electrical equipment causes the temperature of conductors to fluctuate in a wide range. The change in temperature of the conductors will cause the conductors to expand and/or contract. The temperature of aluminum conductors fluctuates more due to the higher coefficient of thermal expansion. The thermal expansion becomes even more difficult to manage in a vertical application. When the cables expand the difference in length must be managed or damage will occur. The contraction of the cables is even worse because the weight of the cables makes it easier for the cables to contract at the top of the cable. As a result, over time, the expansion and contraction causes cables to inch down and pull out of lugs or other termination points.

Thus, it is desirable to provide a system that controls the movement of cables during thermal expansion and contraction.

SUMMARY OF THE INVENTION

A thermal expansion and contraction system for securing cables to a ladder rung is disclosed. The thermal expansion and contraction system includes a cable grip secured to the ladder rung. The cable grip includes a protective grommet to hold the cables to the ladder rung, a metal plate and wire forms to secure the protective grommet to the metal plate. The thermal expansion and contraction system may also include a cable divider and a cable containment clamp. The cable divider is positioned over the ladder rung to create an elevated cable path thereby creating a natural bend point to allow the cables to move during thermal expansion. The cable clamp holds the cables to the ladder rung and allows movement of the cables in a vertical direction.

BRIEF DESCRIPTION OF THE DRAWINGS

FIG. 2 is a perspective view of the metal plate used to secure cables to the ladder rung illustrated in FIG. 1.

FIG. 3 is a perspective view of the wire forms used to secure cables to the ladder rung illustrated in FIG. 1.

FIG. 20A is a sectional view of the wire form being installed in the protective grommet taken along the line 20A-20A of FIG. 20.

FIG. 23 is a perspective view of the spacer used with the thermal expansion cable containment clamp to secure cables to the ladder rung illustrated in FIG. 22.

FIG. 24 is a perspective view of the cam lever used with the thermal expansion cable containment clamp to secure cables to the ladder rung illustrated in FIG. 22.

FIG. 25 is a perspective view of the wire form used with the thermal expansion cable containment clamp to secure cables to the ladder rung illustrated in FIG. 22.

DETAILED DESCRIPTION

Figure 1:
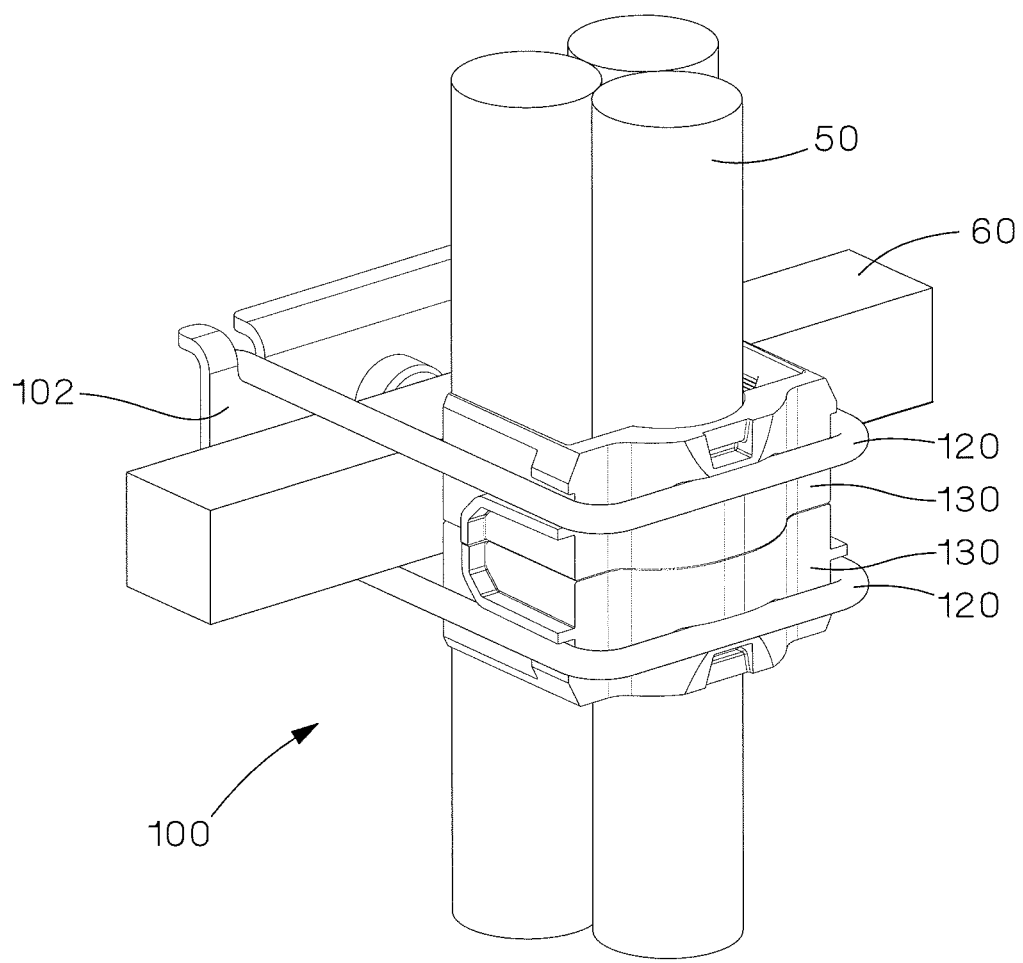
FIG. 1 is a perspective view of a single position thermal expansion cable grip securing cables to a ladder rung.
Figure 4:
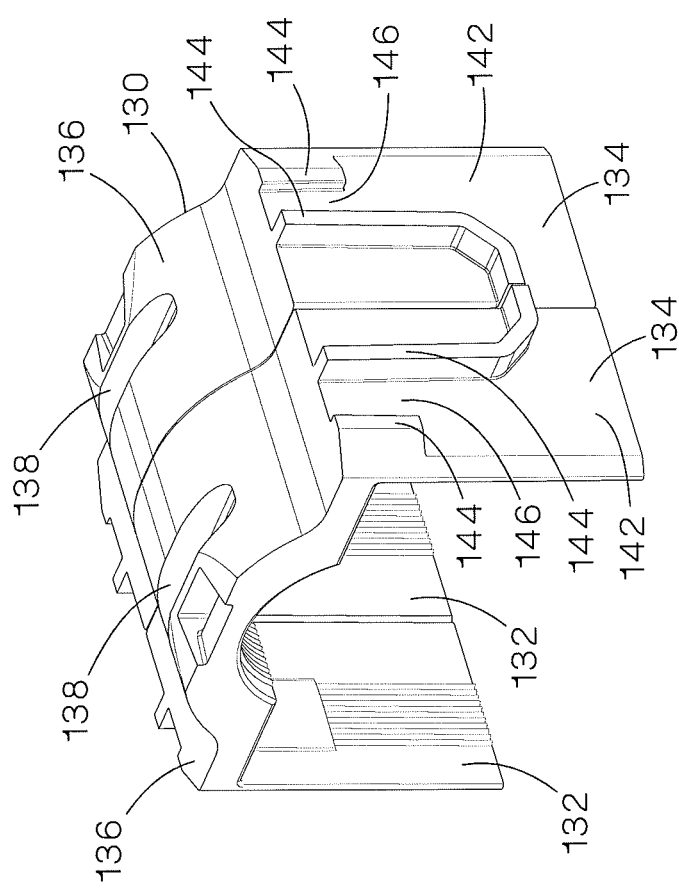
FIG. 4 is a perspective view of the protective grommets used to secure cables to the ladder rung illustrated in FIG. 1.

FIGS. 1-12 illustrate a thermal expansion cable grip 100 securing cable bundles 50 to a ladder rung 60. The single position thermal expansion cable grip 100 includes a metal plate 102 (FIG. 2), two wire forms 120 (FIG. 3) and two protective grommets 130 (FIG. 4). The metal plate 102 includes a main body 104 with downwardly extending sides 106. The metal plate 102 includes one hole 108 positioned near one of the corners and three slots 110 positioned near the other corners. The metal plate 102 also includes a hole 112 in the center of the metal plate 102 for receiving a fastener, such as a bolt 114 and a nut 116, to secure the cable grip 100 to a ladder rung 60.

As illustrated in FIG. 3, the wire forms 120 are generally U-shaped with two parallel legs 122 and two outwardly extending feet 124.

The protective grommets 130 are designed to be positioned over a cable bundle 50 on a ladder rung 60. The protective grommets 130 are generally U-shaped with a top member 136 and side members 142. Each protective grommet 130 includes an inner surface 132 and outer surface 134. The inner surface 132 of the grommet 130 is serrated to provide resistance to cable movement thereby controlling axial movement when the thermal expansion cable grip 100 is installed on the ladder rung 60. This is ideal for vertical applications and controlling thermal expansion. The grommet 130 also protects the cables from damage and maintains integrity of the cable maximum voltage rating.

The outer surface 134 of each grommet 130 includes a channel 138 or slot in the top member 136 to receive a wire form 120 when the cable grip 100 is installed on the ladder rung 60. The side members 142 include a number of projections 144. The projections 144 define channels 146 for maintaining the wire form 120 when the cable grip 100 is installed on the ladder rung 60.

Figure 5:
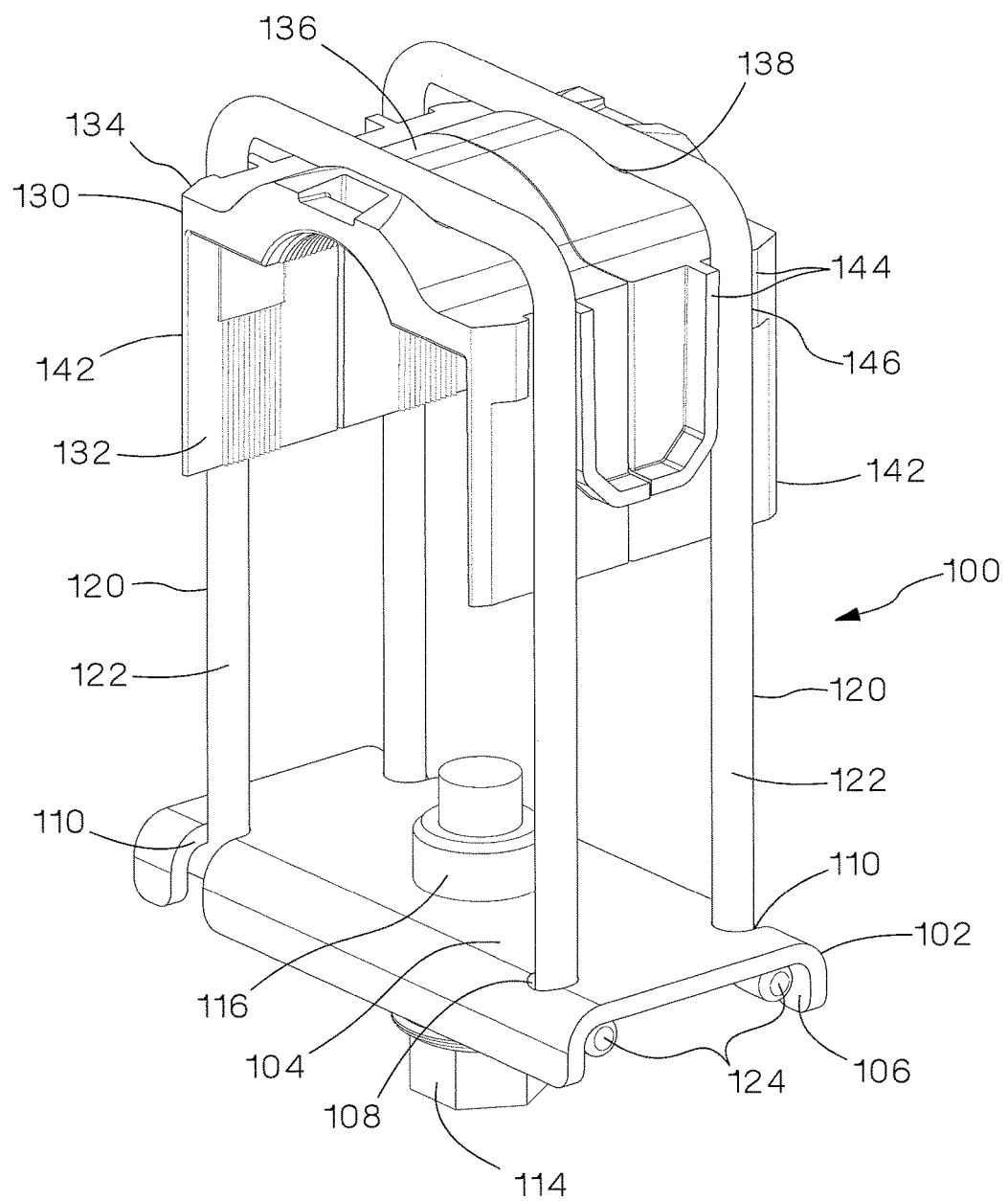
FIG. 5 is a perspective view of the single position thermal expansion cable grip of FIG. 1.

FIG. 5 illustrates an assembled thermal expansion cable grip 100. The metal plate 102 includes a fastener, such as a bolt 114 and nut 116. The fastener controls the lateral movement of a cable bundle 50 when the thermal expansion cable grip 100 is installed. The contact points between the fastener and the ladder rung 60 create a concentrated force when a cable bundle 50 is secured.

Figure 6:
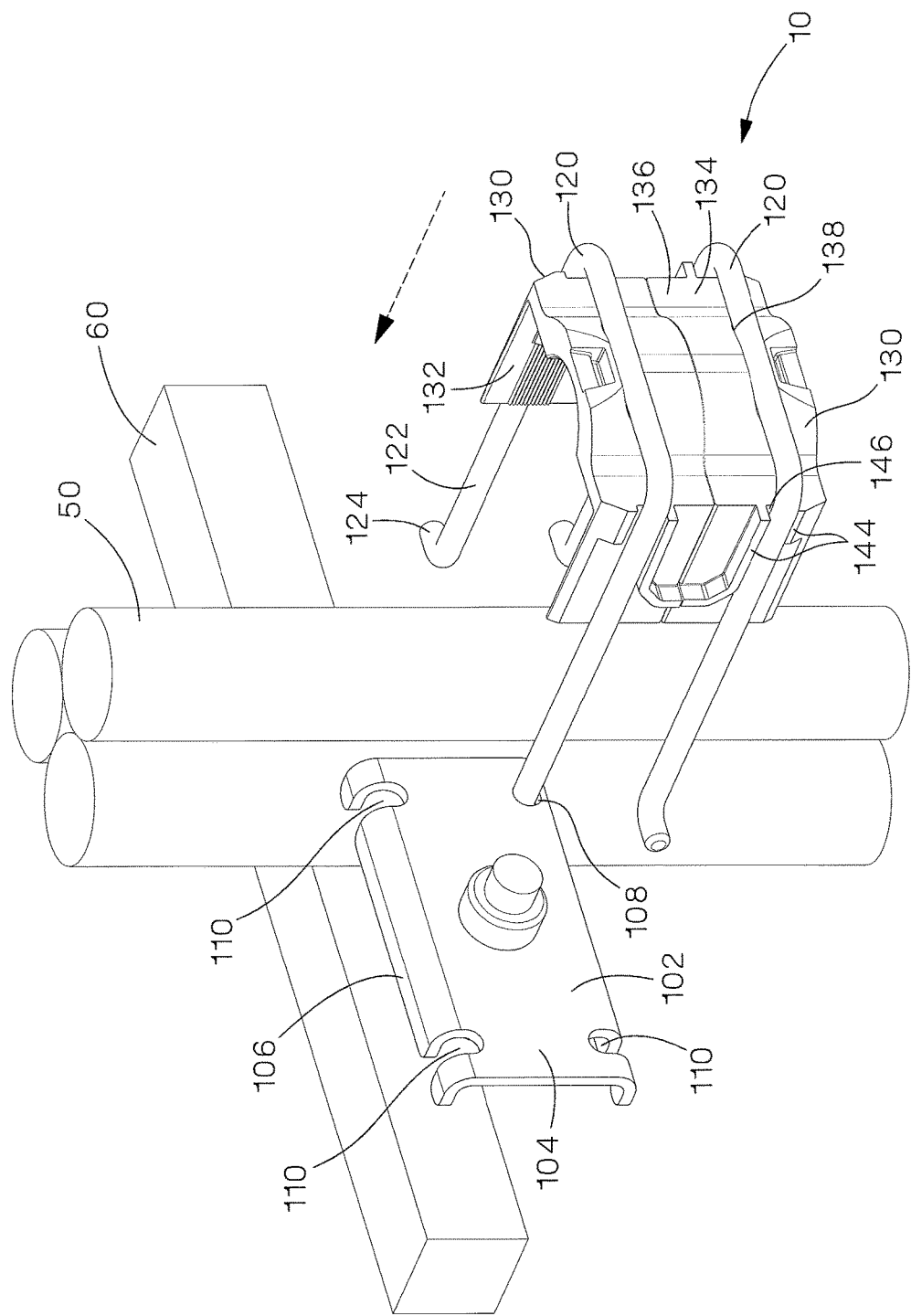
FIG. 6 is an exploded view of the single position thermal expansion cable grip of FIG. 5 positioned to be installed around cables and a ladder rung.
Figure 7A:
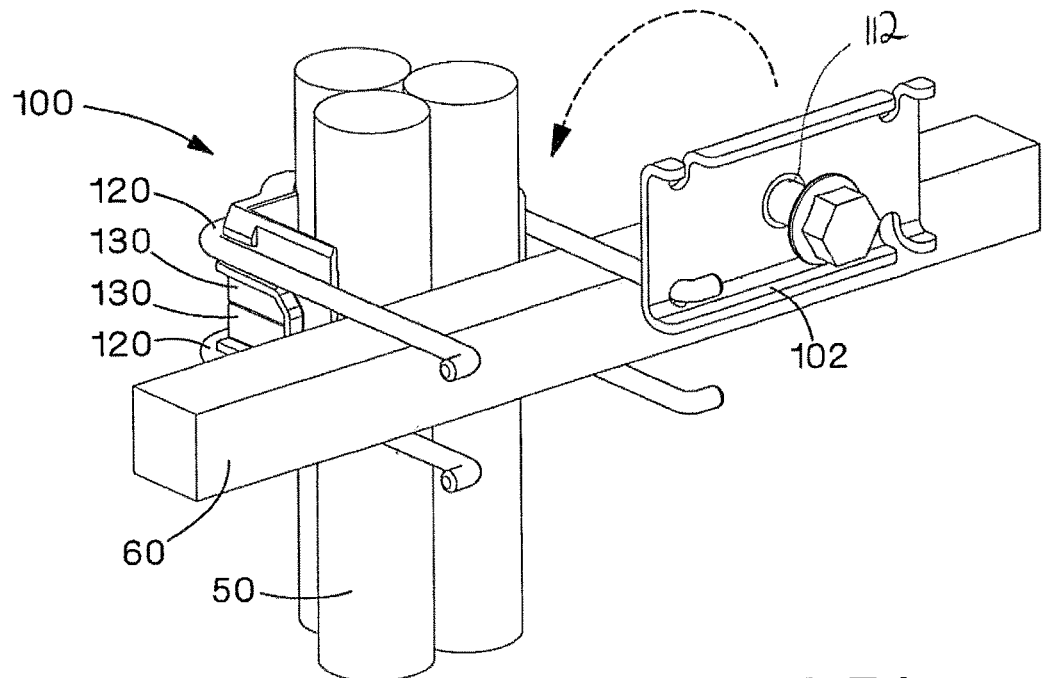
FIG. 7A is a bottom perspective view of the single position thermal expansion cable grip of FIG. 6 with the metal plate positioned to be rotated onto the wire forms.
Figure 7B:
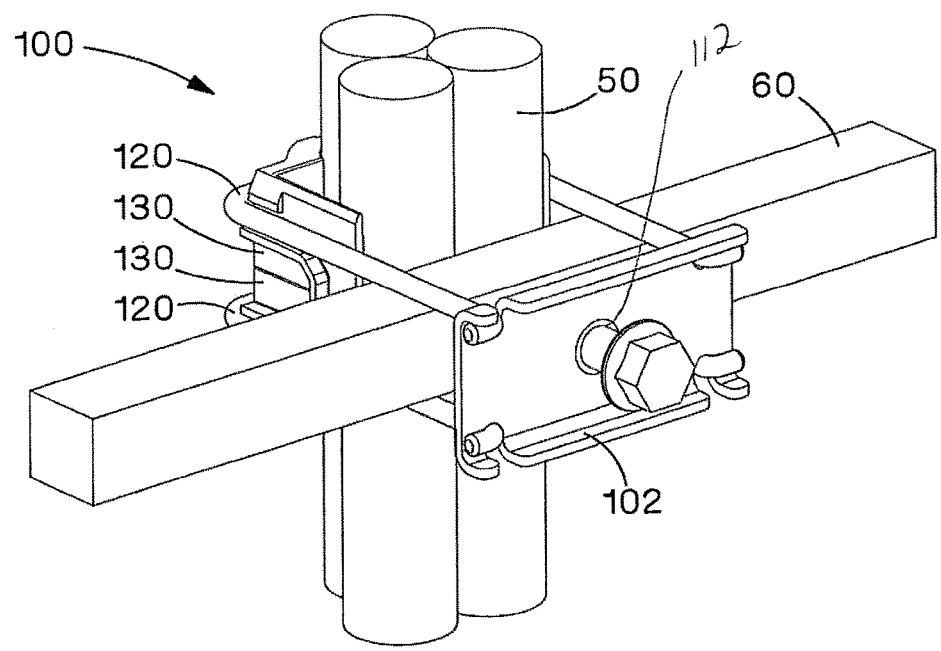
FIG. 7B is a bottom perspective view of the single position thermal expansion cable grip of FIG. 7A with the metal plate rotated onto the wire forms.
Figure 8:
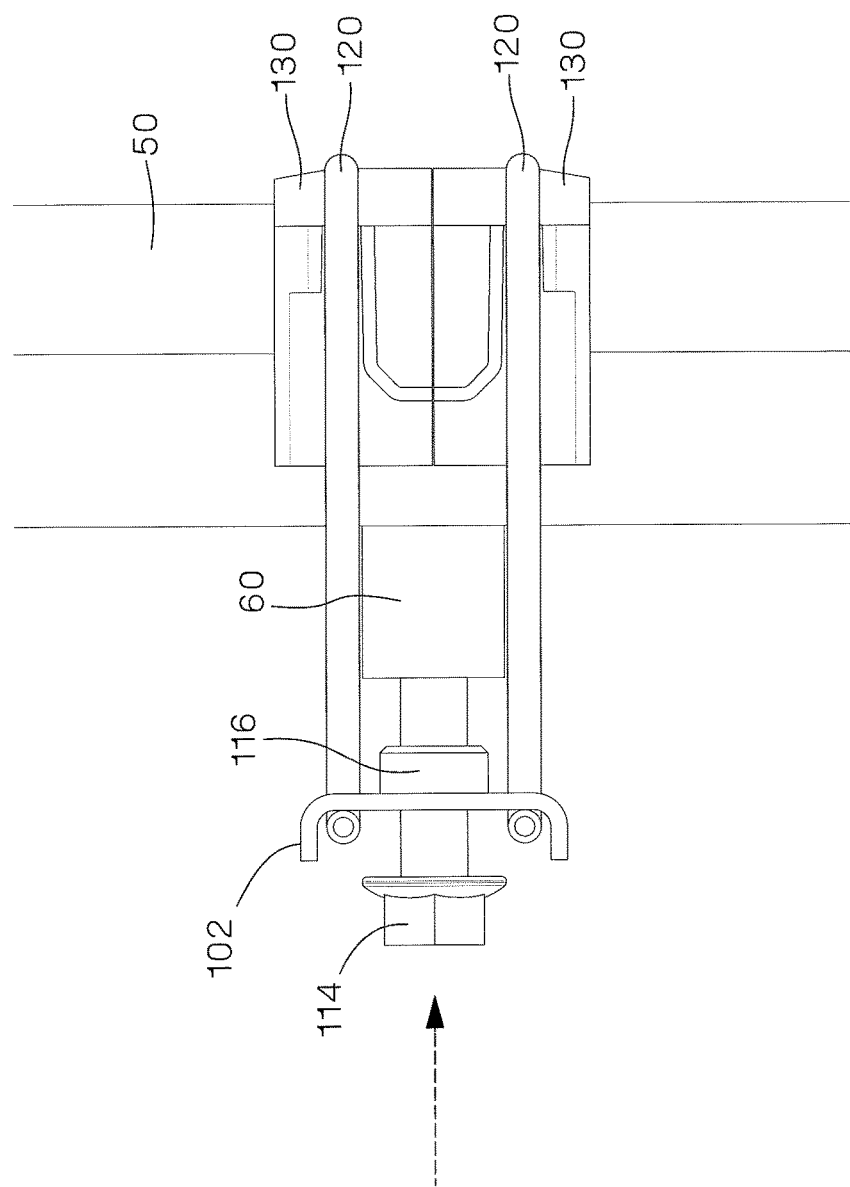
FIG. 8 is a side view of the single position thermal expansion cable grip of FIG. 7B with the bolt positioned to be tightened to secure the cable grip to the ladder rack.
Figure 9:
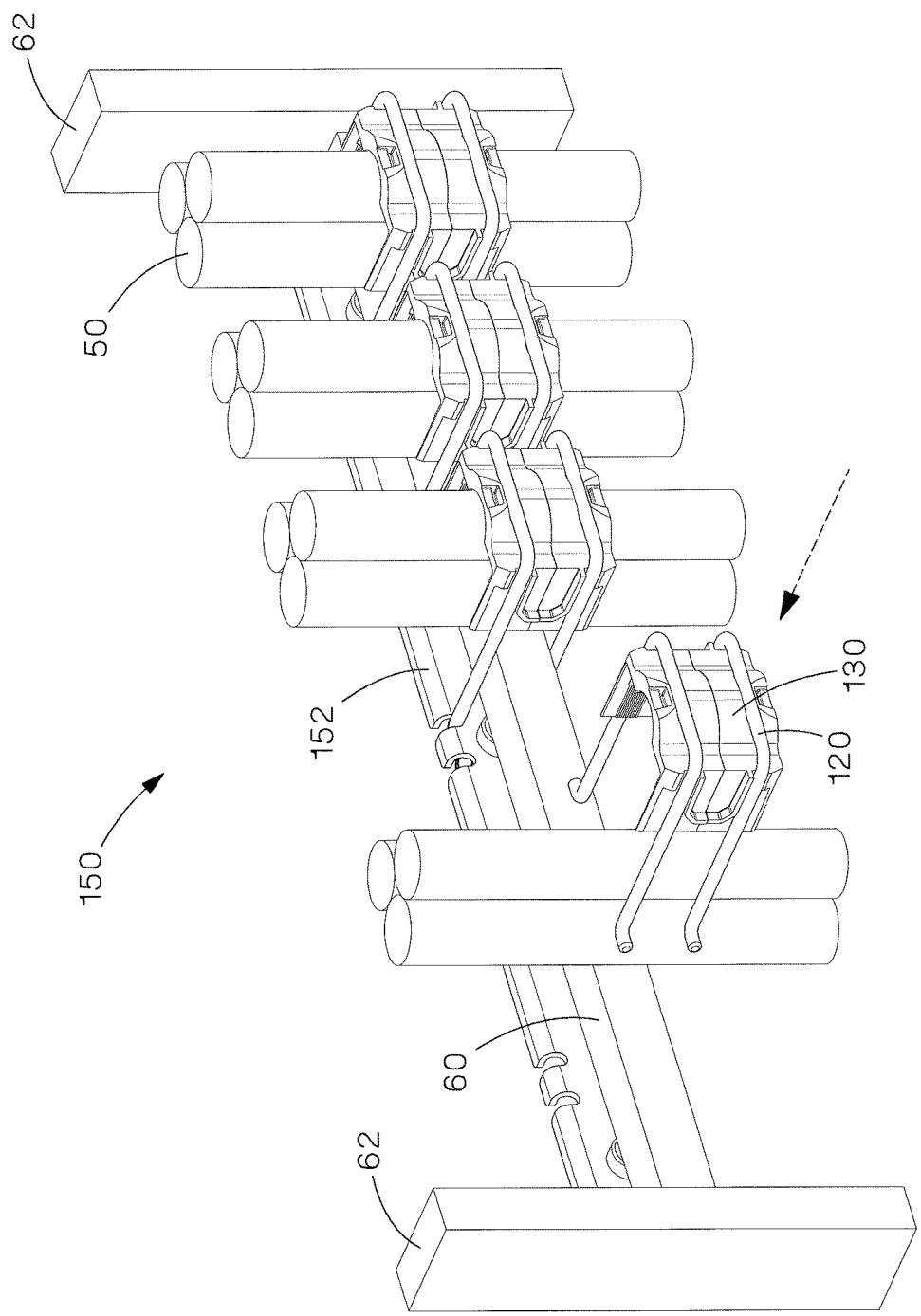
FIG. 9 is a partially assembled perspective view of a multiple position thermal expansion cable grip securing cables to a ladder rung.

FIGS. 6-8 illustrate the installation of the single position thermal expansion cable grip 100. The pre-assembled cable grip 100 is positioned to be installed around a cable bundle 50 and a ladder rung 60. One wire form leg 122 is installed in the corner hole 108 in the metal plate 102. Once the protective grommets 130 and wire forms 120 are positioned around the cable bundle 50 and the ladder rung 60, the metal plate 102 is rotated such that the wire forms 120 can be secured in the slots 110 in the metal plate 102. A tool is used to tighten the fastener to complete the installation of the thermal expansion cable grip 100. The single position thermal expansion cable grip 100 may be installed at any position on the ladder rung.

FIGS. 9-12 illustrate a multiple position thermal expansion cable grip 150. The multiple position thermal expansion cable grip 100 is installed in a fixed position on a ladder rung between two ladder side rails 62. The multiple position cable grip simplifies installation and insures that the cable bundle spacing will be the same ladder rung to ladder rung.

Figure 10:
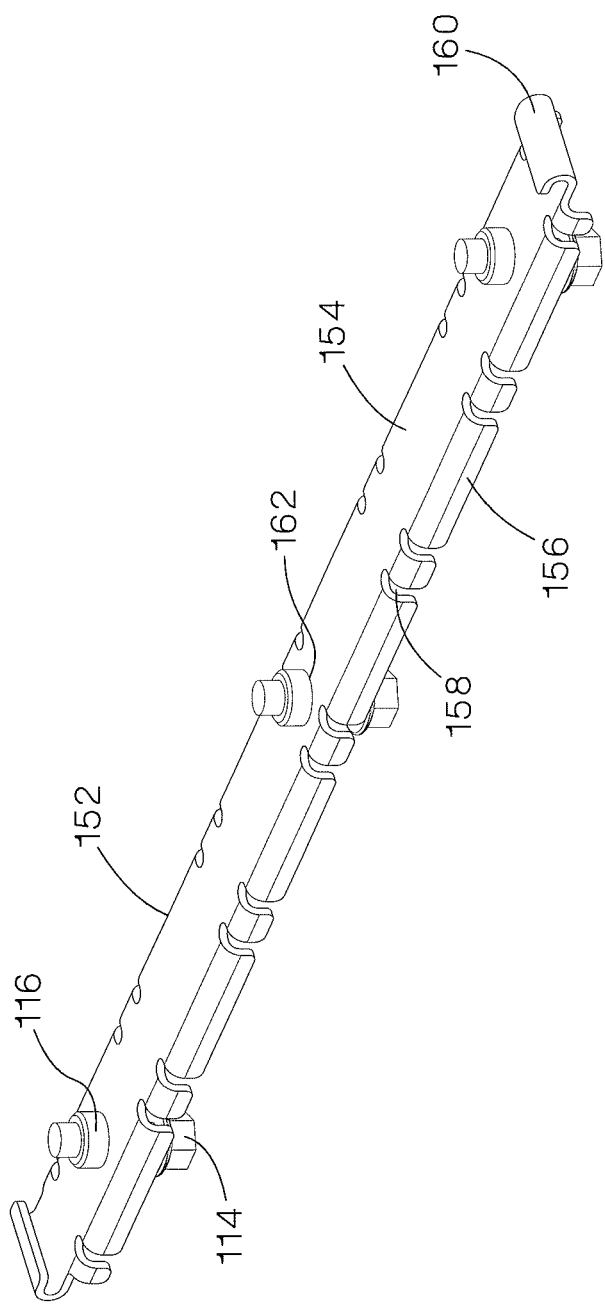
FIG. 10 is a perspective view of a multiple position metal plate used to secure cables to the ladder rung illustrated in FIG. 9.
Figure 11:
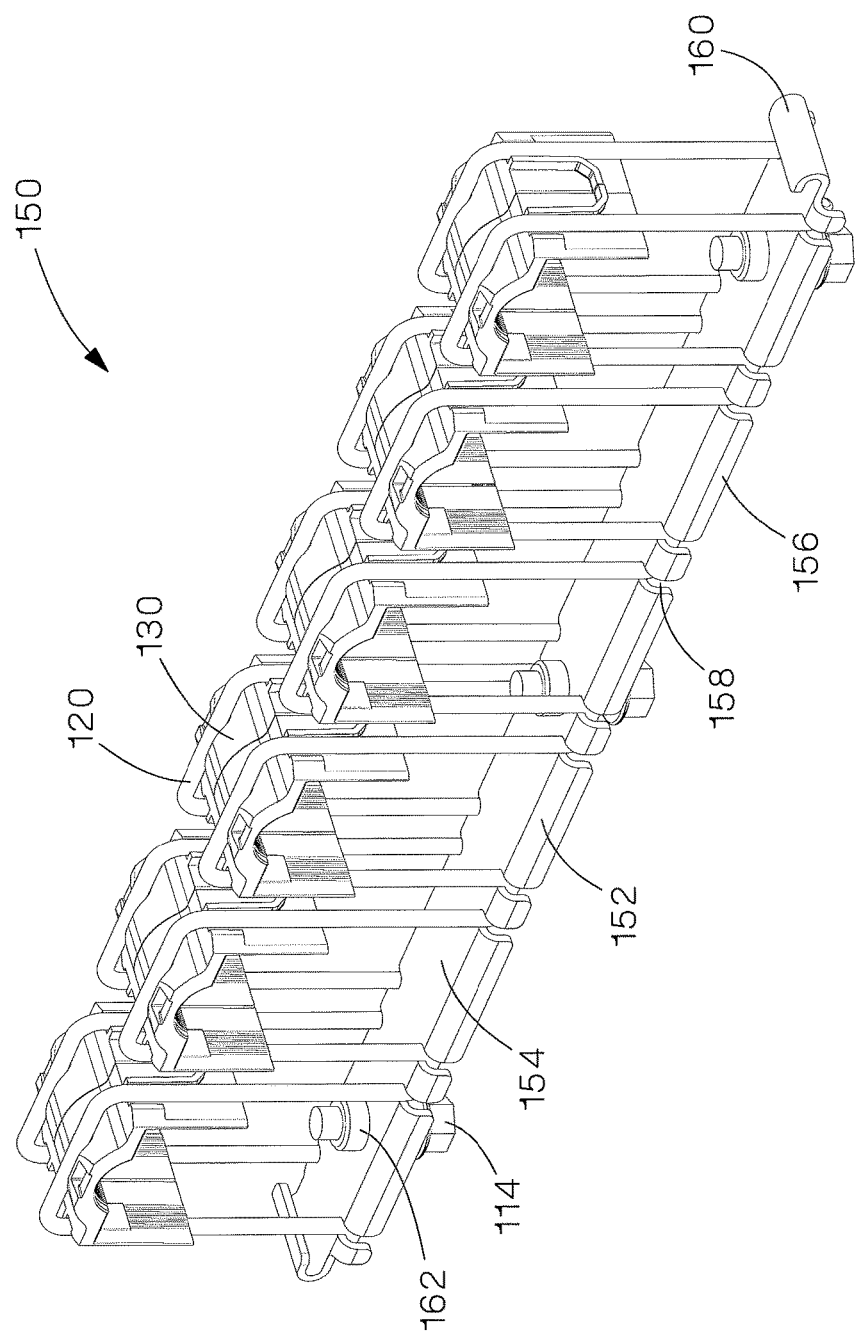
FIG. 11 is a perspective view of the multiple position thermal expansion cable grip of FIG. 9.
Figure 12:
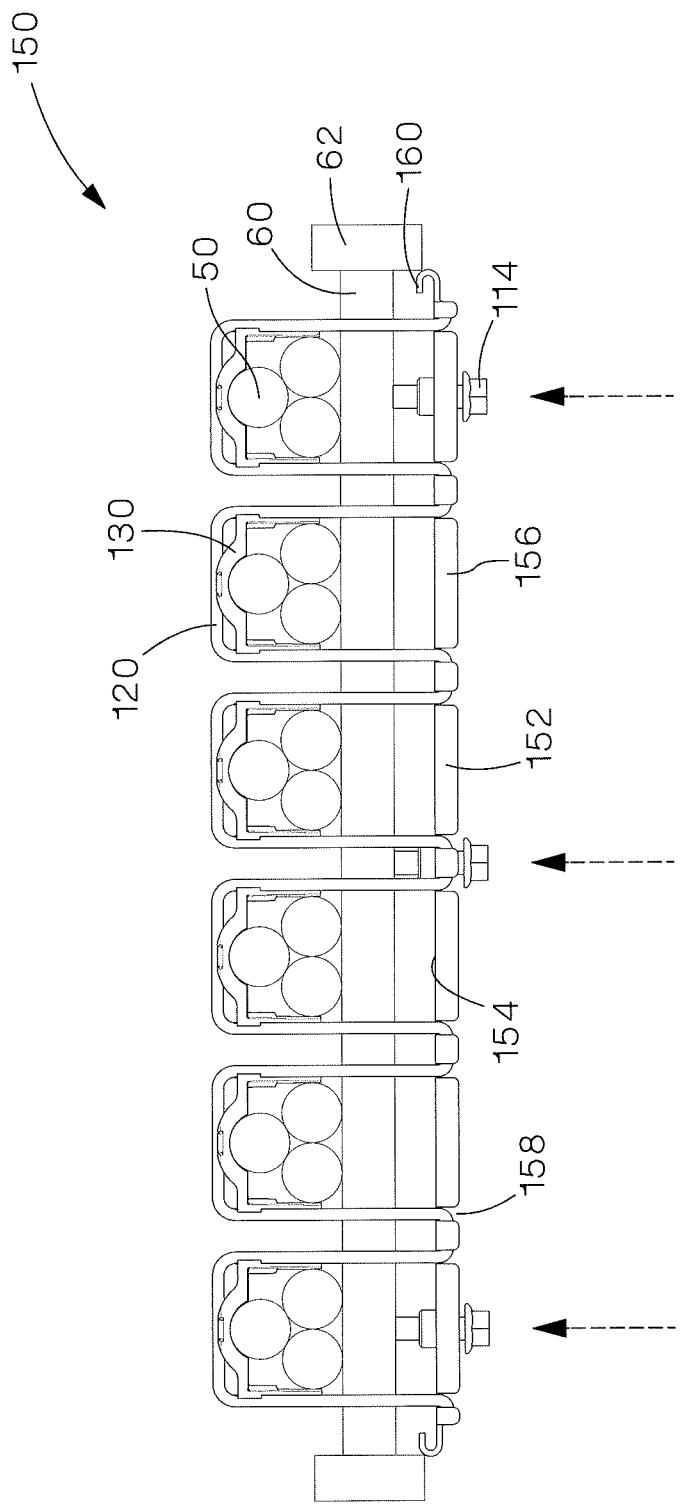
FIG. 12 is a front view of the multiple position thermal expansion cable grip of FIG. 9 installed on a ladder rung.
Figure 13:
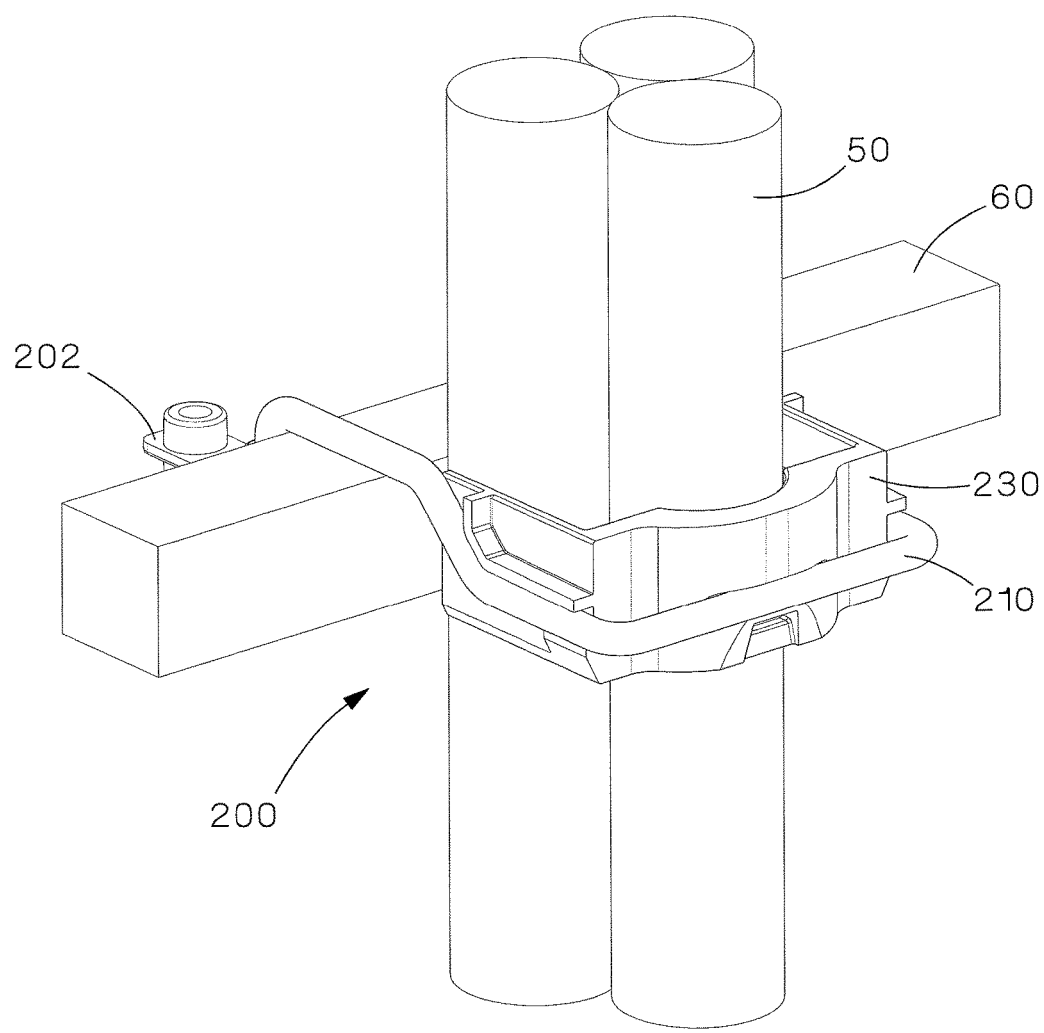
FIG. 13 is a perspective view of a single position thermal expansion cable containment clamp securing cables to a ladder rung.

The multiple position thermal expansion cable grip 150 is pre-assembled using one metal plate 152, twelve wire forms 120 and twelve protective grommets 130. FIG. 10 illustrates the multiple position metal plate 152. The metal plate 152 includes a main body 154 and downwardly extending sides 156. The metal plate 152 also includes a plurality of slots 158 for receiving the wire forms 120, curved ends 160, and a number of center holes 162 for receiving fasteners to secure the cable grip 150 to the ladder rung 60.

Figure 15:
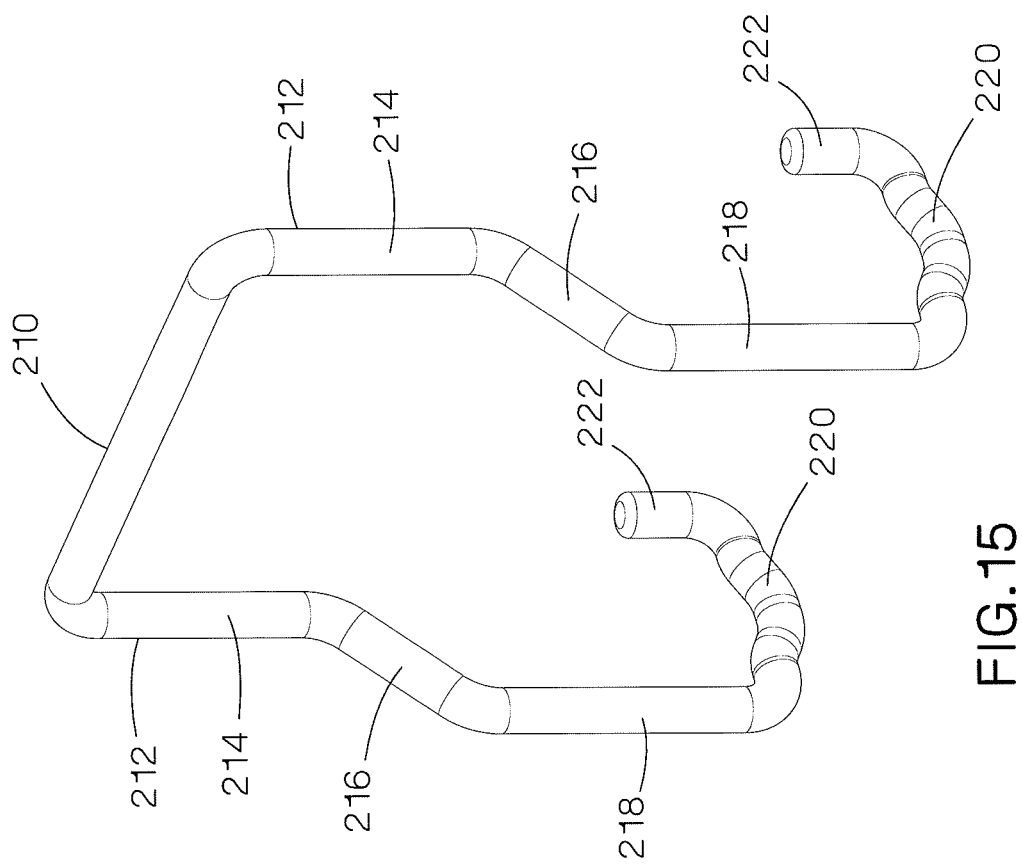
FIG. 15 is a perspective view of the wire form used to secure cables to the ladder rung illustrated in FIG. 13.
Figure 16:
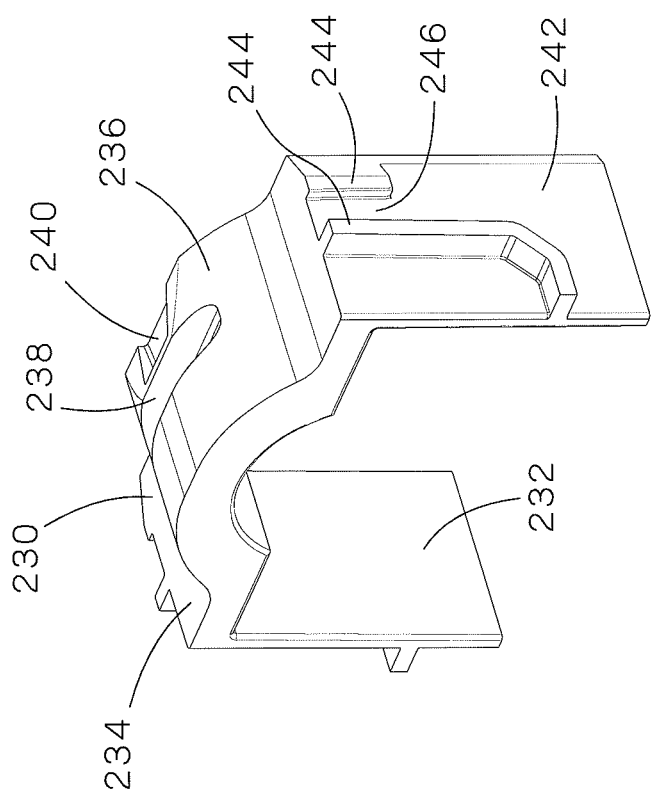
FIG. 16 is a perspective view of the protective grommet used to secure cables to the ladder rung illustrated in FIG. 13.
Figure 17:
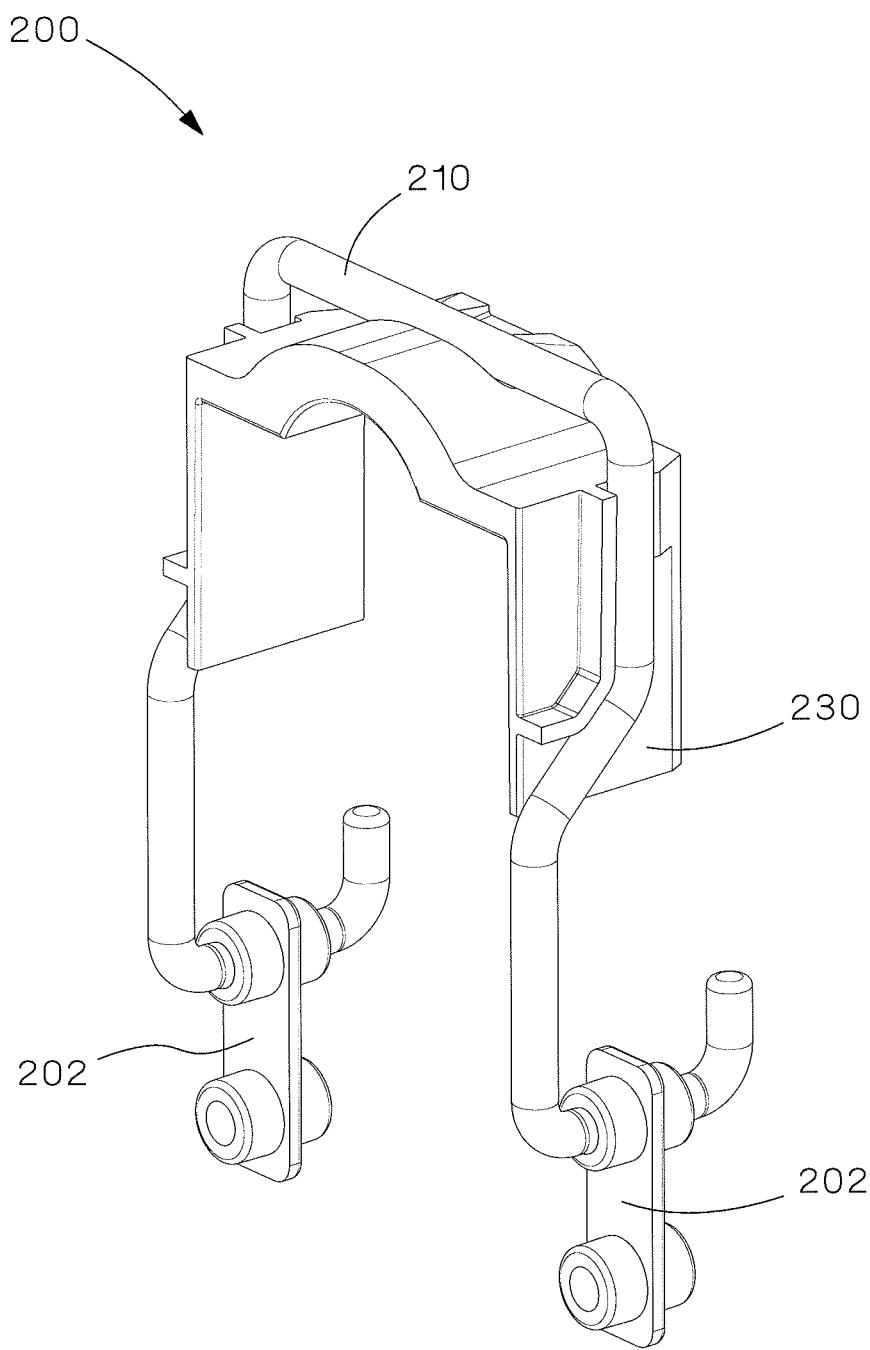
FIG. 17 is a perspective view of the single position thermal expansion cable containment clamp of FIG. 13.

FIGS. 13-21 illustrate a single and multiple position thermal expansion cable containment clamp 200. The single position cable containment clamp is pre-assembled with spacers 202 (FIG. 14), a wire form 210 (FIG. 15) and a protective grommet 230 (FIG. 16). The single position cable containment clamp 200 may be installed at any position on the ladder rung.

Figure 14:
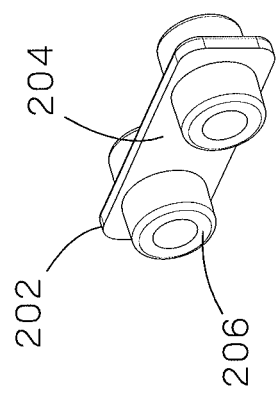
FIG. 14 is a perspective view of the spacer used with the thermal expansion cable containment clamp to secure cables to the ladder rung illustrated in FIG. 13.

As illustrated in FIG. 14, the spacers 202 include a rectangular body 204 with rubber stops 206 that secure the spacer 202 to a wire form 210.

As illustrated in FIG. 15, the wire form 210 includes two legs 212 with parallel portions 214, 218, angled offset portions 216, hook latches 220 and ends 222. The hook latches 220 allow the wire form 210 to be installed on a round or square ladder rung. The angled offset portion 216 of the wire form 210 allows the locking force to be centered over the ladder rung thereby securing the cable bundle 50.

Similar to the protective grommet 130 illustrated in FIG. 4, the protective grommet 230 is generally U-shaped with a top member 236 and side members 242 (see FIG. 16). Each protective grommet 230 includes an inner surface 232 and outer surface 234. The inner surface 232 of the grommet 230 may be serrated. The outer surface 234 of each grommet 230 includes a channel 238 or slot in the top member 236 to receive a wire form 210 when the cable containment clamp 200 is installed on the ladder rung 60. The top member 236 also includes a pry slot 240 positioned adjacent the channel 238. The pry slot 240 is designed to receive a tool for installing the wire form 210 on the protective grommet 230. The side members 242 include a number of projections 244. The projections 244 define channels 246 for maintaining the wire form 210 when the cable containment clamp 200 is installed on the ladder rung 60. The protective grommets 230 control the axial movement of the cables on the ladder rung 60 by allowing the cable bundle 50 to move accommodating for cable expansion.

Figure 18:
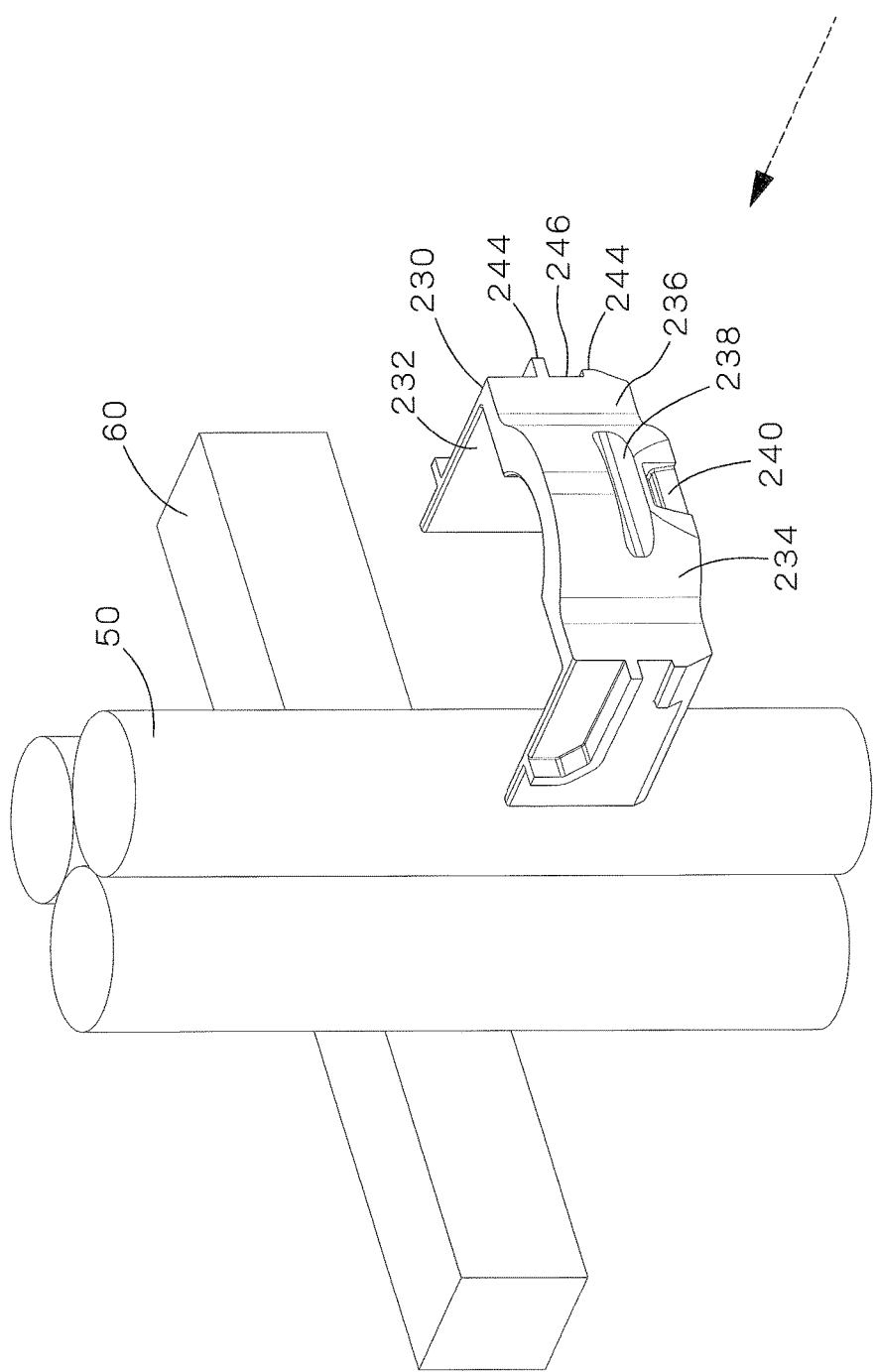
FIG. 18 is a perspective view of the protective grommet of FIG. 13 positioned to be installed around cables and a ladder rung.
Figure 19:
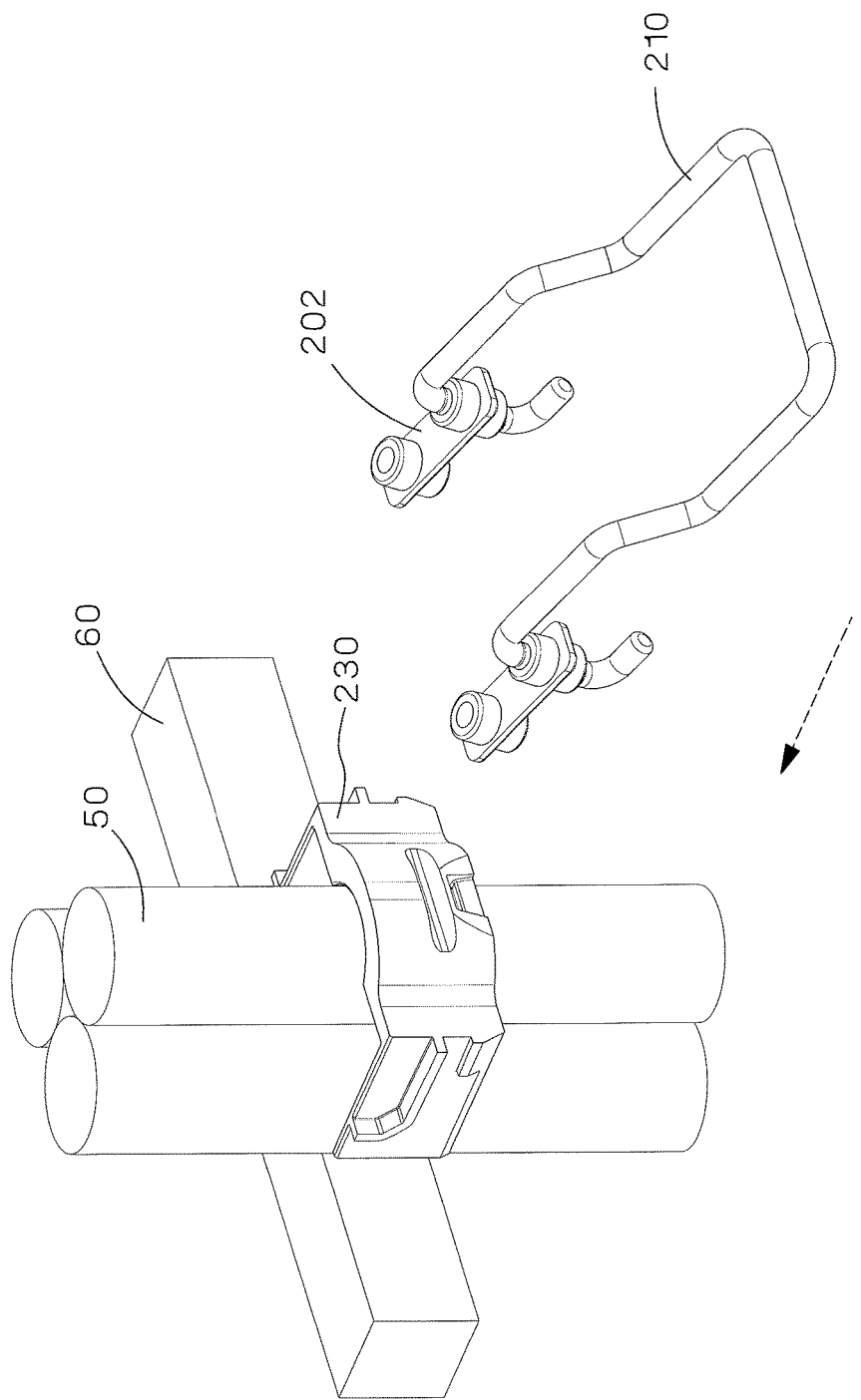
FIG. 19 is a perspective view of the wire form and spacer positioned to be installed around the grommet, cables and ladder rung of FIG. 18.
Figure 20:
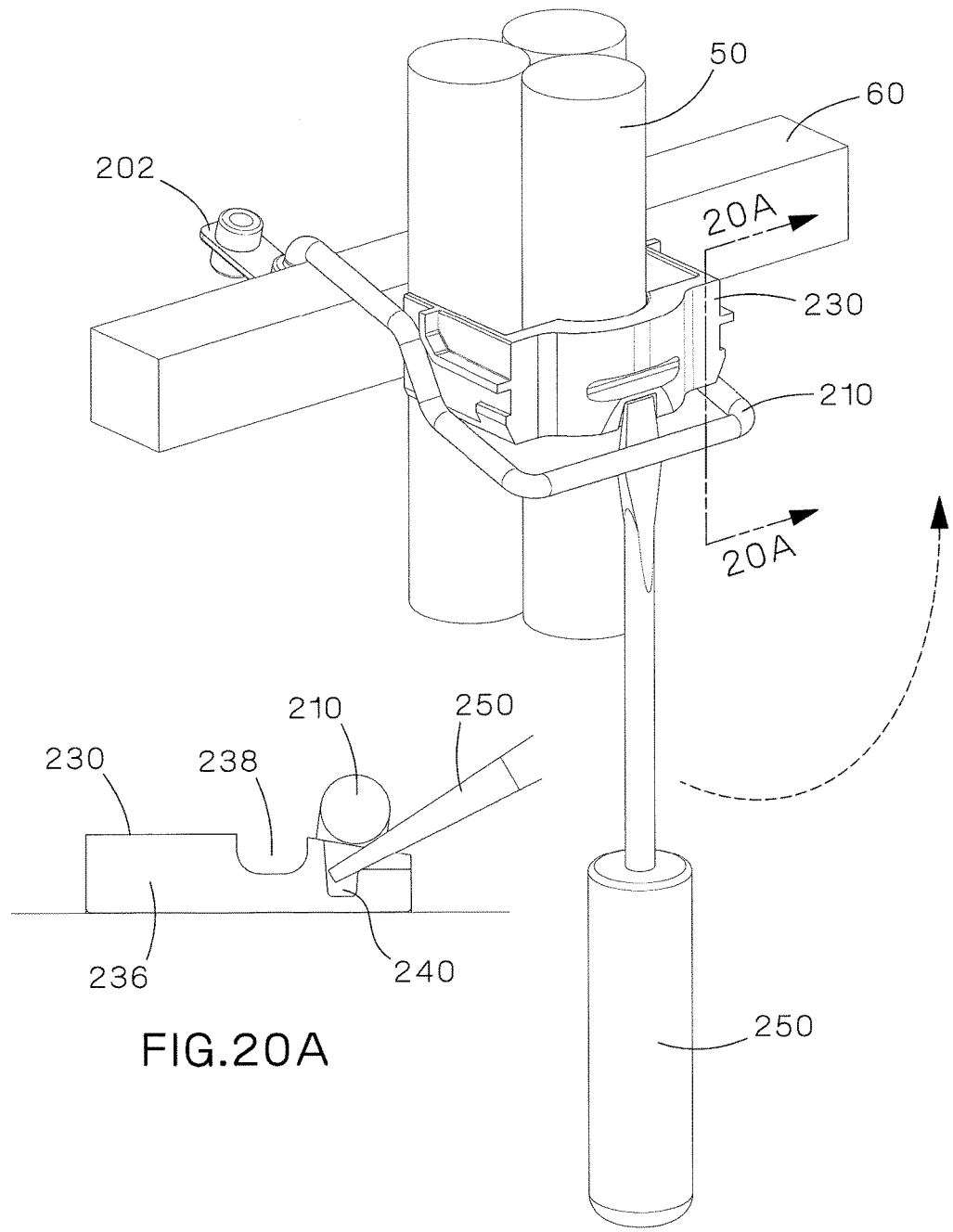
FIG. 20 is a perspective view of the cable containment clamp of FIG. 19 being installed on the cables and ladder rung by a screw driver.

FIGS. 18-20A illustrate the installation of the single position thermal expansion cable containment clamp 200. The protective grommet 230 is positioned over the cable bundle 50 on a ladder rung 60 (FIG. 18). As illustrated in FIG. 19, the wire form 210 is positioned at an angle over the ladder rung 60 and around the protective grommet 230 and cable bundle 50. As illustrated in FIGS. 20 and 20A, a tool, such as a screw driver 250, is positioned in the pry slot 240 to engage the wire form 210 and urge it into the channel 238 in the top member 236 of the protective grommet 230.

Figure 21:
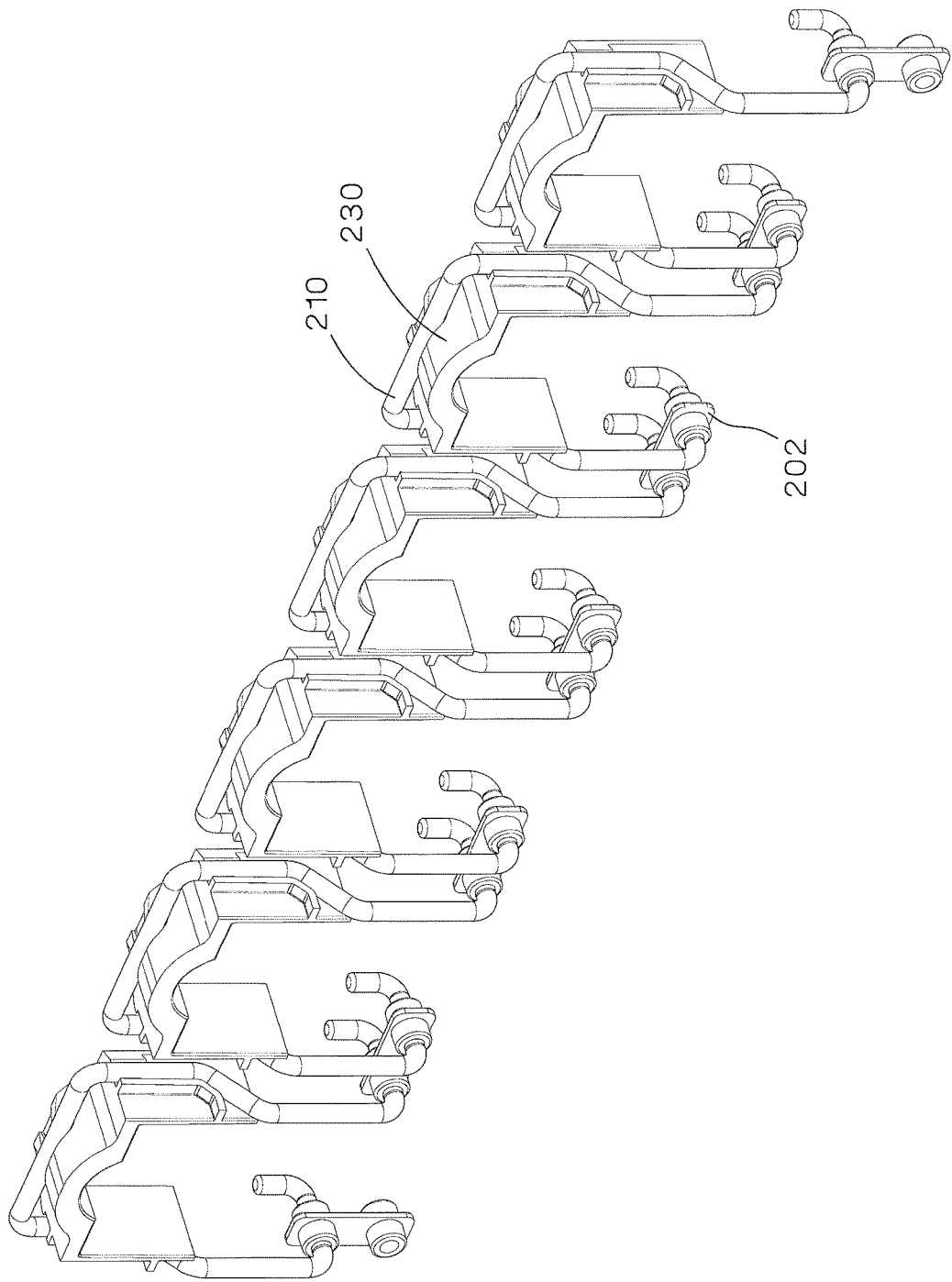
FIG. 21 is a perspective view of a multiple position thermal expansion cable containment clamp.

As illustrated in FIG. 21, a multiple position thermal expansion cable containment clamp is pre-assembled with seven spacers 202, six wire forms 210 and six protective grommets 230. The multiple position cable containment clamp is installed in a fixed position on a ladder rung. This simplifies installation and insures that the cable bundle spacing will be the same ladder rung to ladder rung.

FIGS. 22-31 illustrate a single position and a multiple position thermal expansion cable containment clamp 300 similar to the thermal expansion cable clamp 200 illustrated in FIGS. 13-21. The thermal expansion cable containment clamp 300 illustrated in FIGS. 22-31 includes a cam lever 360 for installing the cable containment clamp 300.

Figure 26:
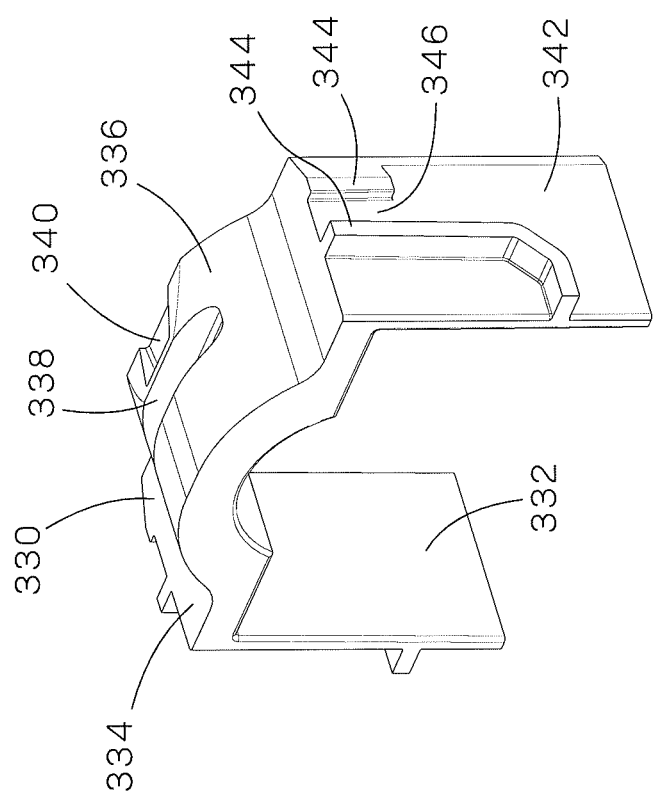
FIG. 26 is a perspective view of the protective grommet used with the thermal expansion cable containment clamp to secure cables to the ladder rung illustrated in FIG. 22.

The single position cable containment clamp 300 is pre-assembled with spacers 302 (FIG. 23), one cam lever 360 (FIG. 24), one wire form 310 (FIG. 25), and one protective grommet 330 (FIG. 26).

As illustrated in FIG. 23, the spacers 302 include a rectangular body 304 with rubber stops 306 that secure the spacer 302 to a wire form 310.

Figure 22:
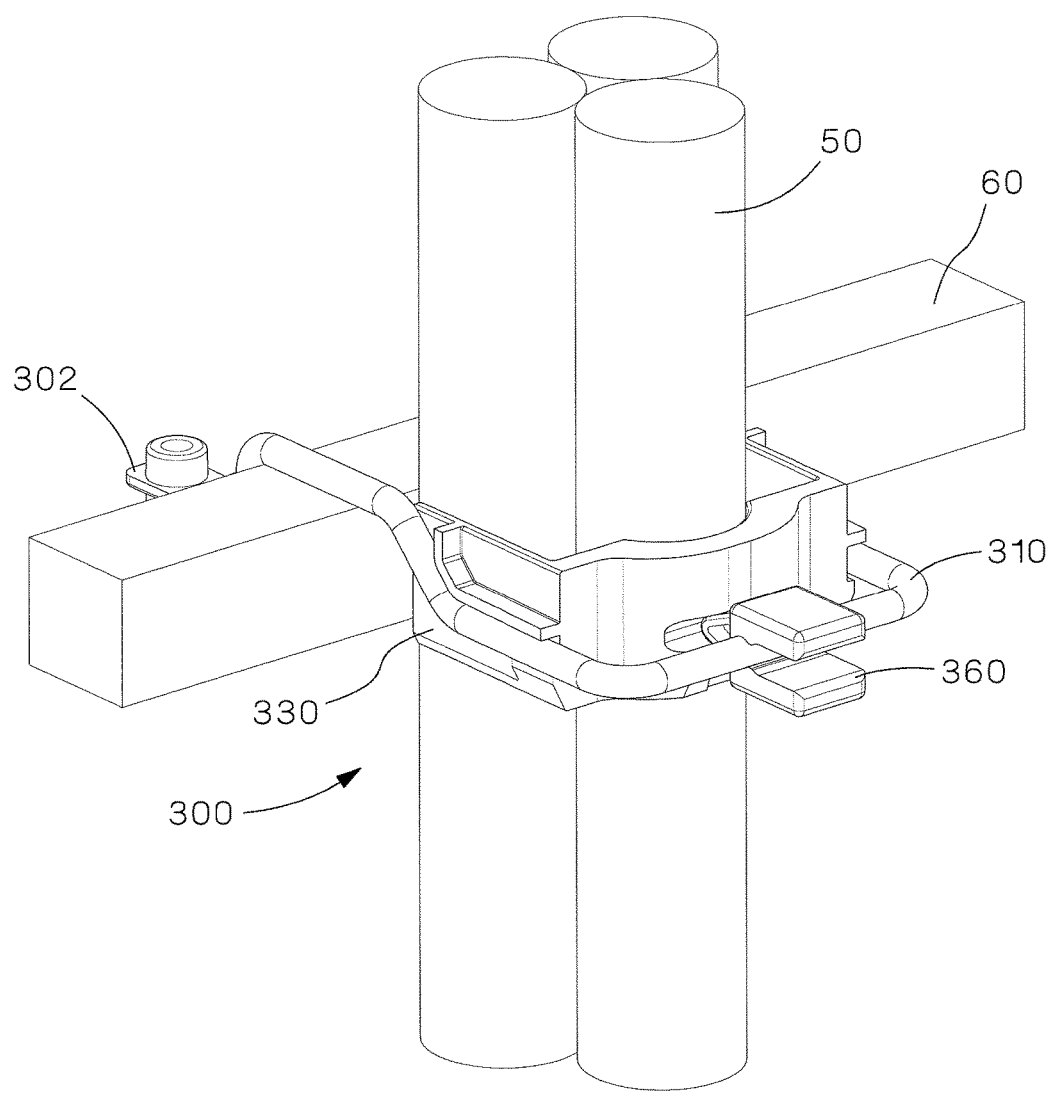
FIG. 22 is a perspective view of an alternative design of a single position thermal expansion cable containment clamp securing cables to a ladder rung.
Figure 27:
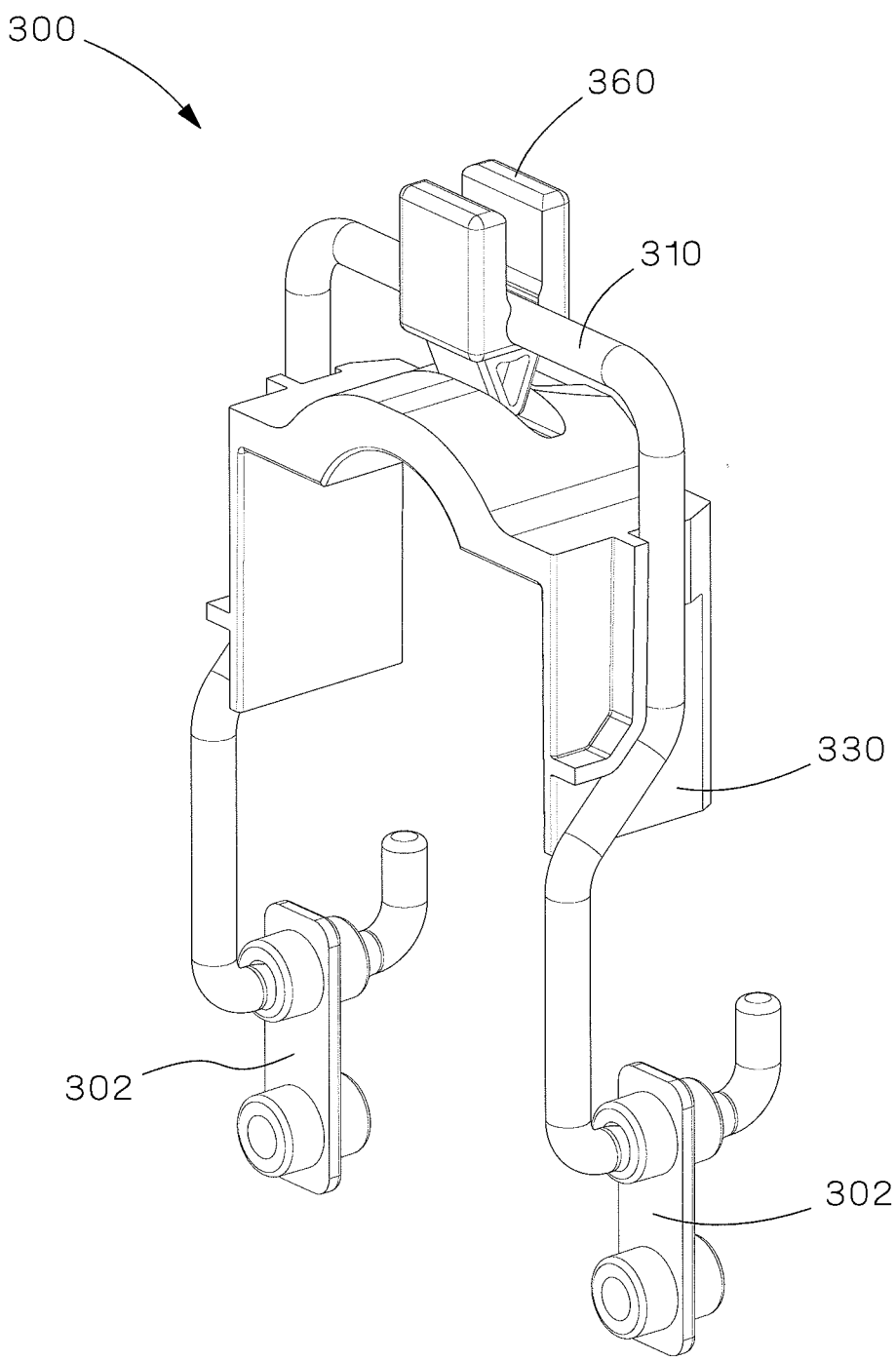
FIG. 27 is a perspective view of the single position thermal expansion cable containment clamp of FIG. 22.

As illustrated in FIG. 24, the cam lever 360 includes a center opening 362 and a wedge shaped bottom 364 for engaging the channel 338 in the protective grommet 330. As illustrated in FIGS. 22 and 27, the cam lever 360 receives the wire form 310 and is positioned in the channel 338 in the top member 336 of the protective grommet 330.

As illustrated in FIG. 25, the wire form 310 includes two legs 312 with parallel portions 314, 318, angled offset portions 316, hook latches 320 and ends 322. The hook latches 320 allow the wire form 310 to be installed on a round or square ladder rung. The angled offset portion 316 of the wire form 310 allows the locking force to be centered over the ladder rung thereby securing the cable bundle 50.

As illustrated in FIG. 26, the protective grommet 330 is generally U-shaped with a top member 336 and side members 342. The protective grommet 330 includes an inner surface 332 and an outer surface 334. The inner surface 332 of the grommet 330 may be serrated to lock the cable bundle 50 into position. The outer surface 334 of each grommet 330 includes a channel 338 or slot in the top member 336 to receive the cam lever 360 and the wire form 310 when the cable containment clamp 300 is installed on the ladder rung 60. The side members 342 include a number of projections 344. The projections 344 define channels 346 for maintaining the wire form 310 when the cable containment clamp 300 is installed on the ladder rung 60. The protective grommets 330 control the axial movement of the cables on the ladder rung 60 by allowing the cable bundle 50 to move accommodating for cable expansion.

Figure 28:
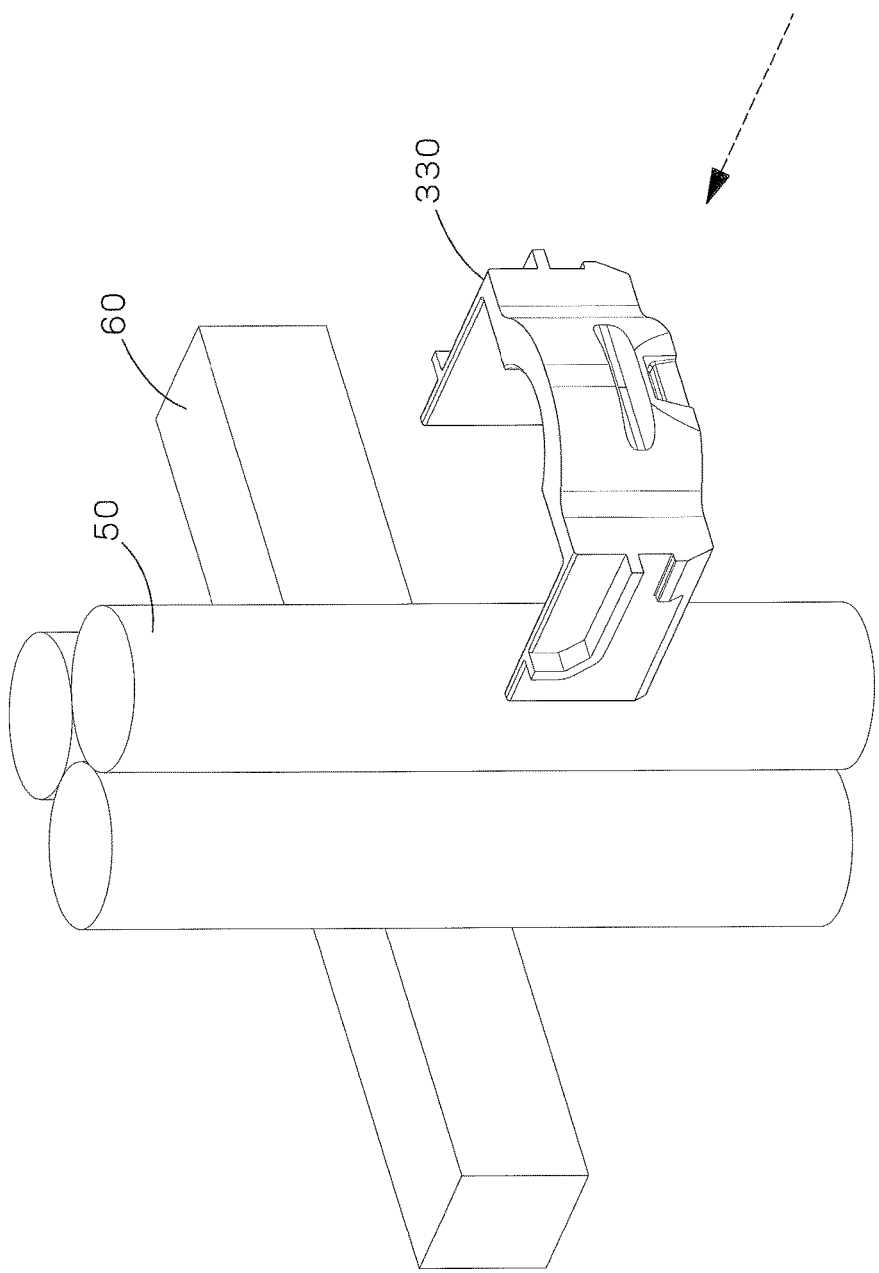
FIG. 28 is a perspective view of the protective grommet of FIG. 22 positioned to be installed around cables and a ladder rung.
Figure 29:
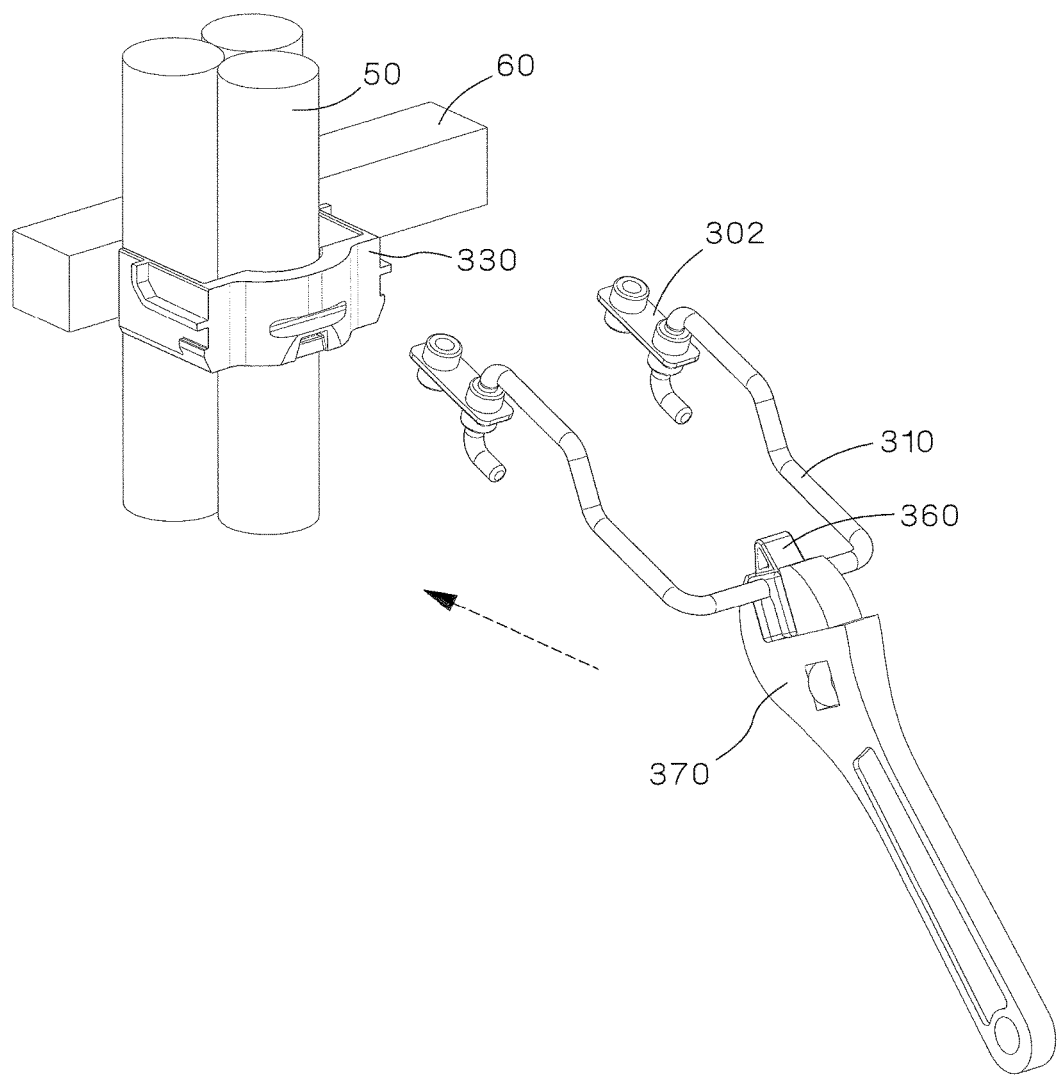
FIG. 29 is a perspective view of the wire form, spacer and cam lever with a wrench positioned to be installed around the grommet, cables and ladder rung of FIG. 28.
Figure 30:
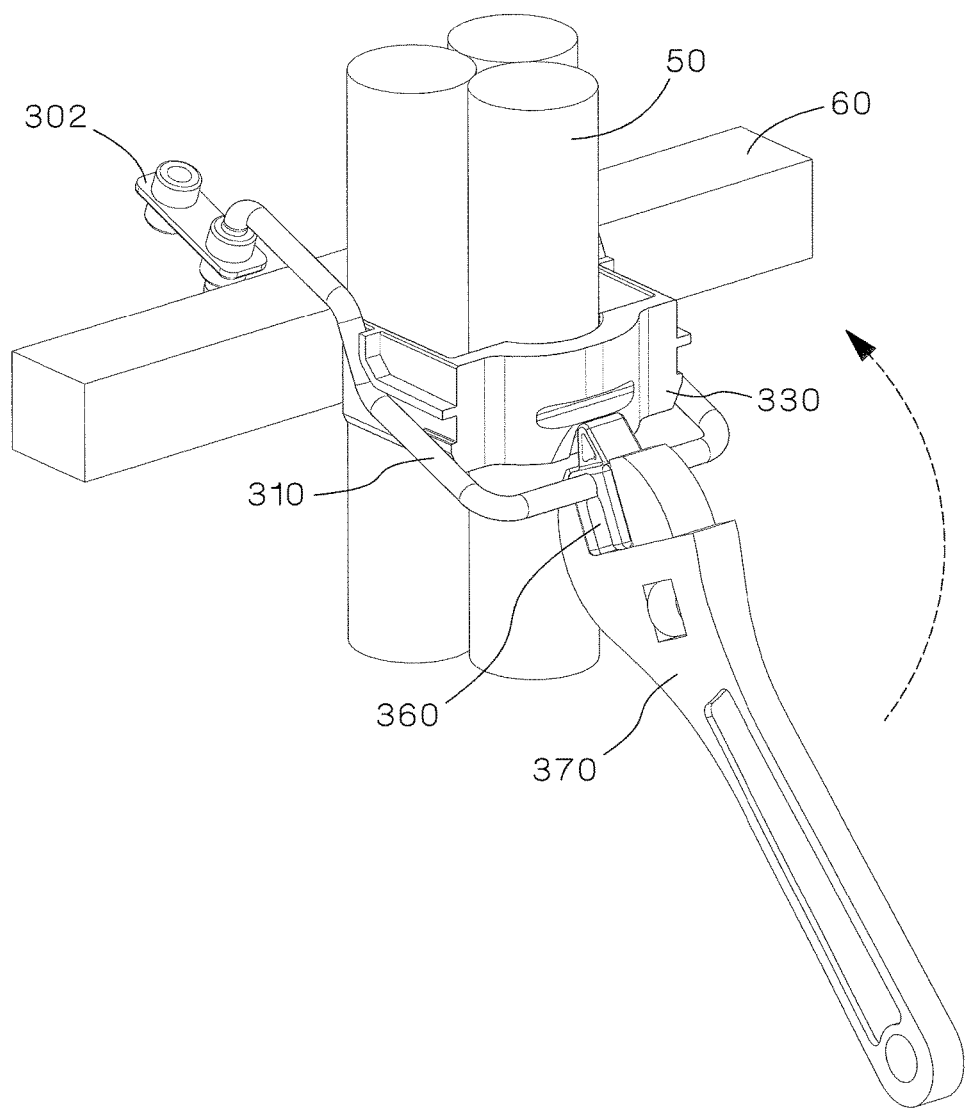
FIG. 30 is a perspective view of the cable containment clamp of FIG. 29 being installed on the cables and ladder rung by the cam lever and wrench.

FIGS. 28-30 illustrate the installation of the single position thermal expansion cable containment clamp 300. The protective grommet 330 is positioned over a cable bundle 50 positioned on a ladder rung 60. The wire form 310 with attached spacers 302 and cam lever 360 is positioned at angle to be installed over the protective grommet 330. Once the wire form 310 is positioned around the ladder rung 60, the cam lever 360 is rotated via a tool, such as a wrench 370, to secure the cable containment clamp 300 to the ladder rung 60.

Figure 31:
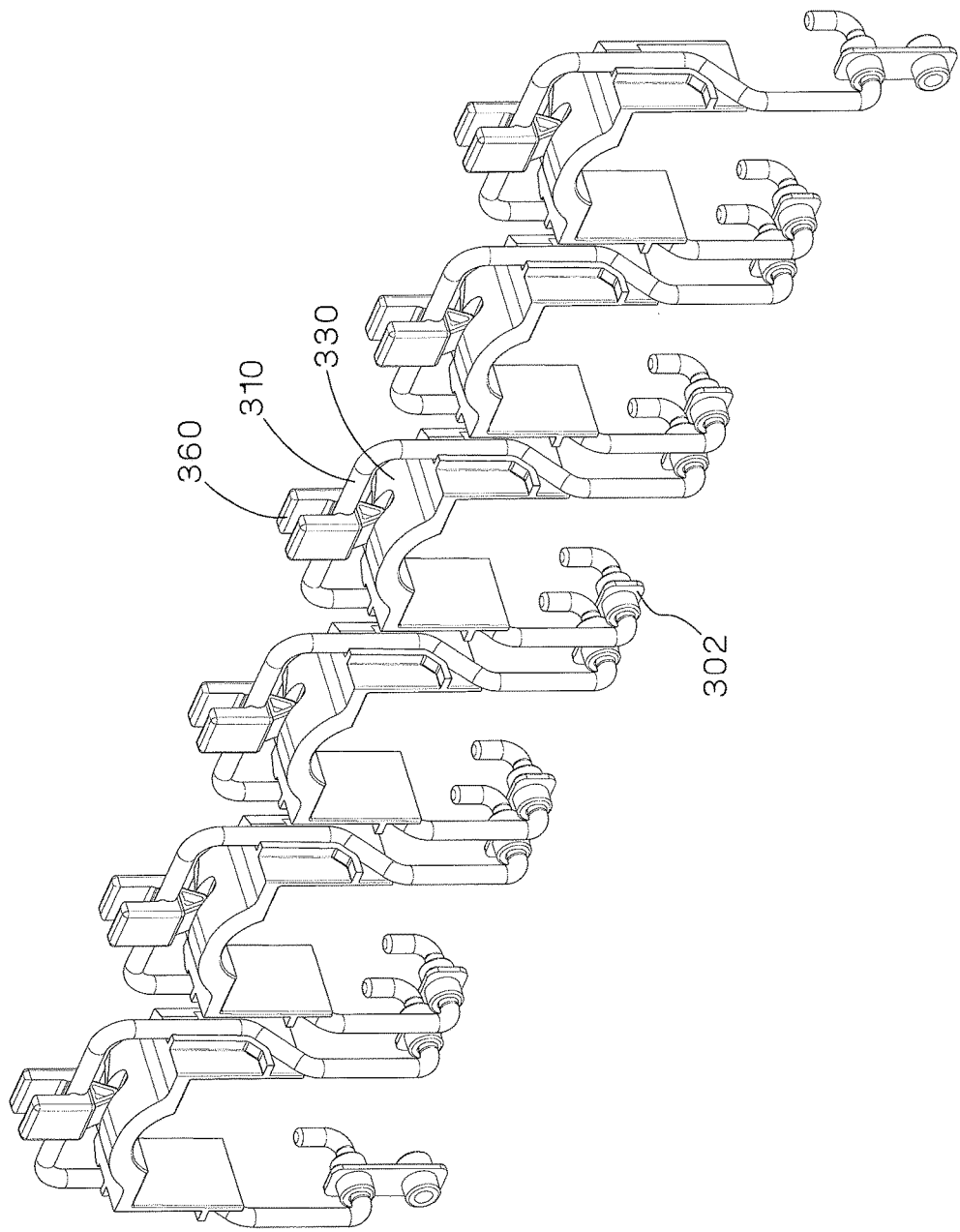
FIG. 31 is a perspective view of an alternative design of a multiple position thermal expansion cable containment clamp.
Figure 32:
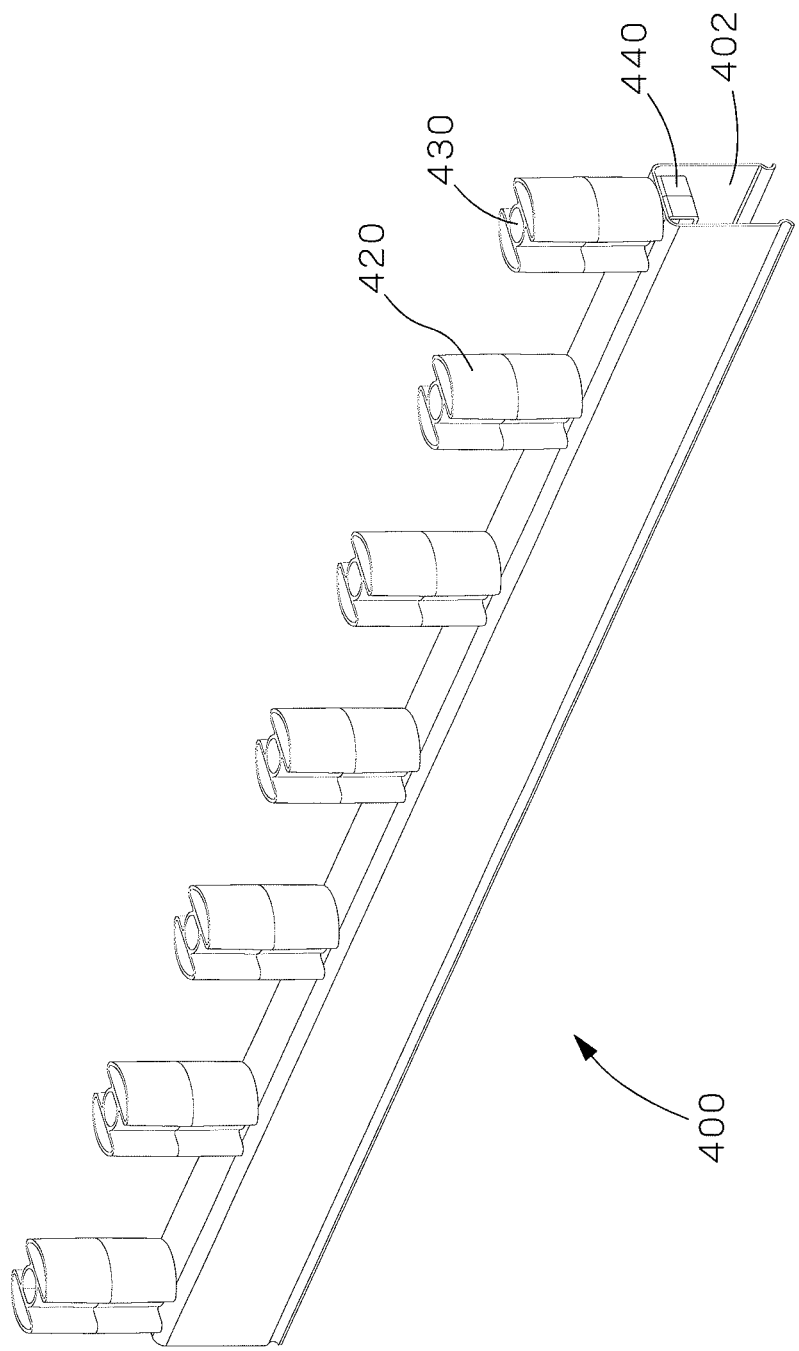
FIG. 32 is a perspective view of a thermal expansion cable divider.
Figure 33:
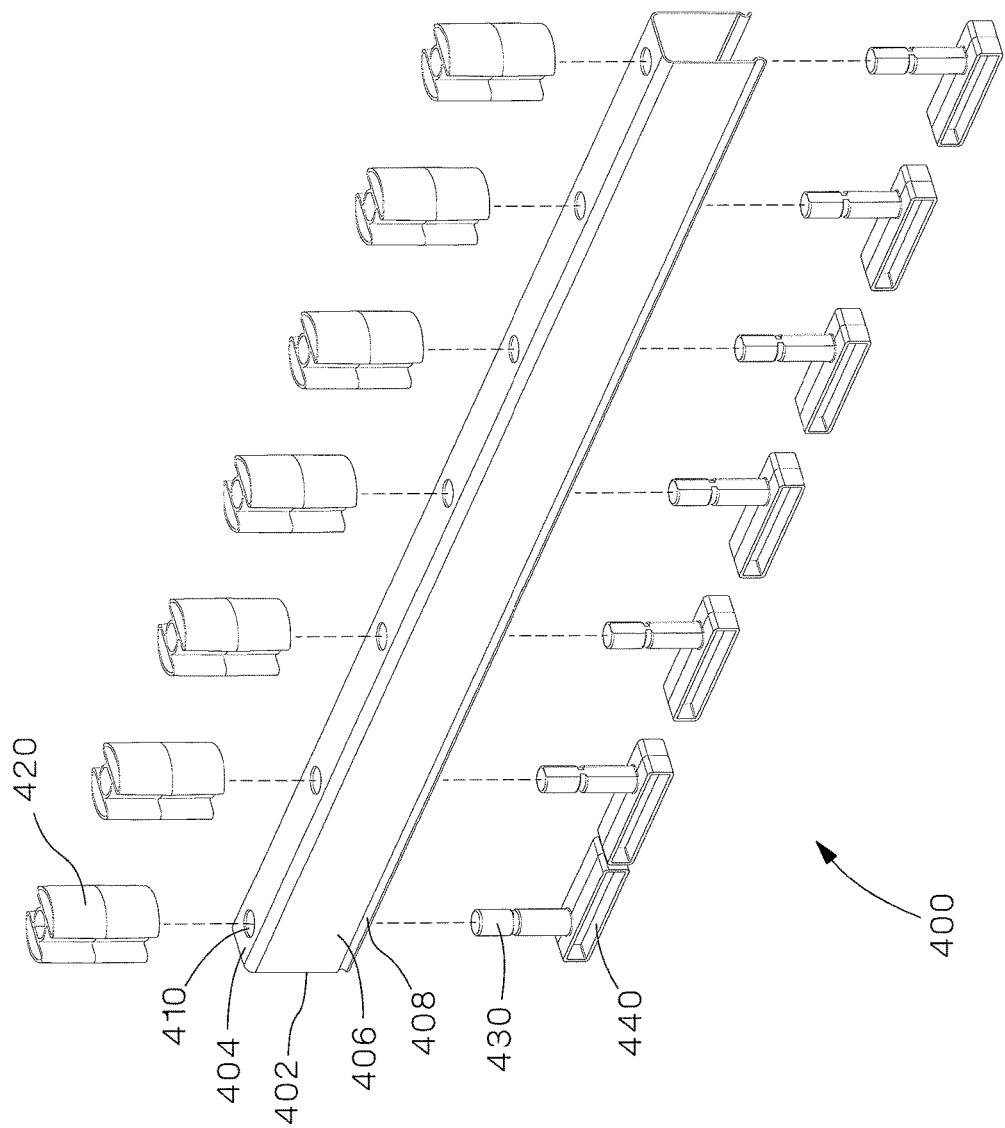
FIG. 33 is an exploded view of the thermal expansion cable divider of FIG. 32.
Figure 34:
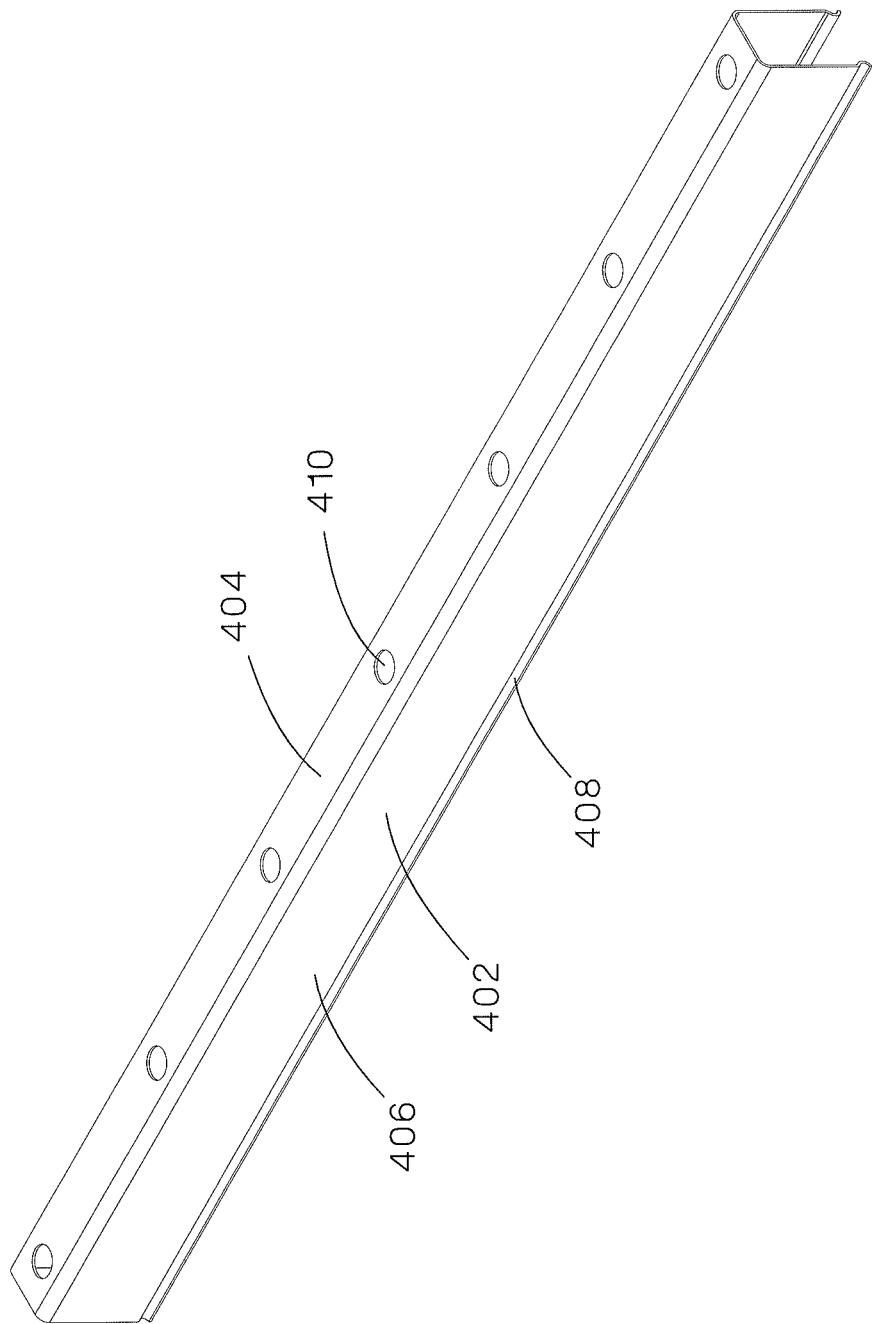
FIG. 34 is a perspective view of the divider bracket of FIG. 32.

As illustrated in FIG. 31, the pre-assembled multiple position thermal expansion clamp 300 includes seven spacers 302, six wire forms 310, six protective grommets 330 and six cam levers 360. As discussed above, the multiple position thermal expansion cable containment clamp is installed in a fixed position and insures that the cable bundle spacing will be the same ladder rung to ladder rung.

Figure 35:
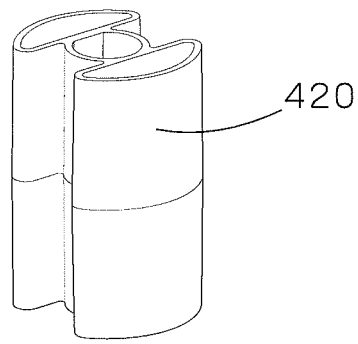
FIG. 35 is a perspective view of the cable spacer of FIG. 32.
Figure 36:
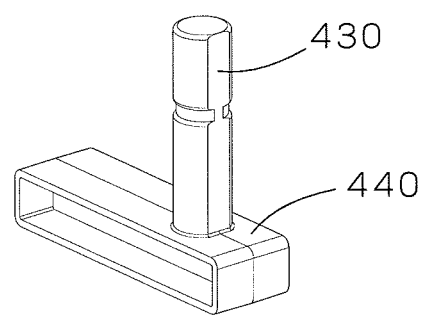
FIG. 36 is a perspective view of the spacer mount and bracket elevation block of FIG. 32.

FIGS. 32-39 illustrate a thermal expansion cable divider 400. The cable divider 400 includes a bracket 402 (FIG. 33), spacers 420 (FIG. 34), spacer mounts 430 and elevation blocks 440 (FIG. 35). The bracket 402 is generally C-shaped with a main member 404 and two side members 406 having curved ends 408. The main member 404 includes a plurality of holes 410 located along the main member 404 for receiving the spacer mounts 430. The elevation blocks 440 are positioned under the bracket 402. The cable spacers 420 are then secured to the spacer mounts 430.

Figure 37:
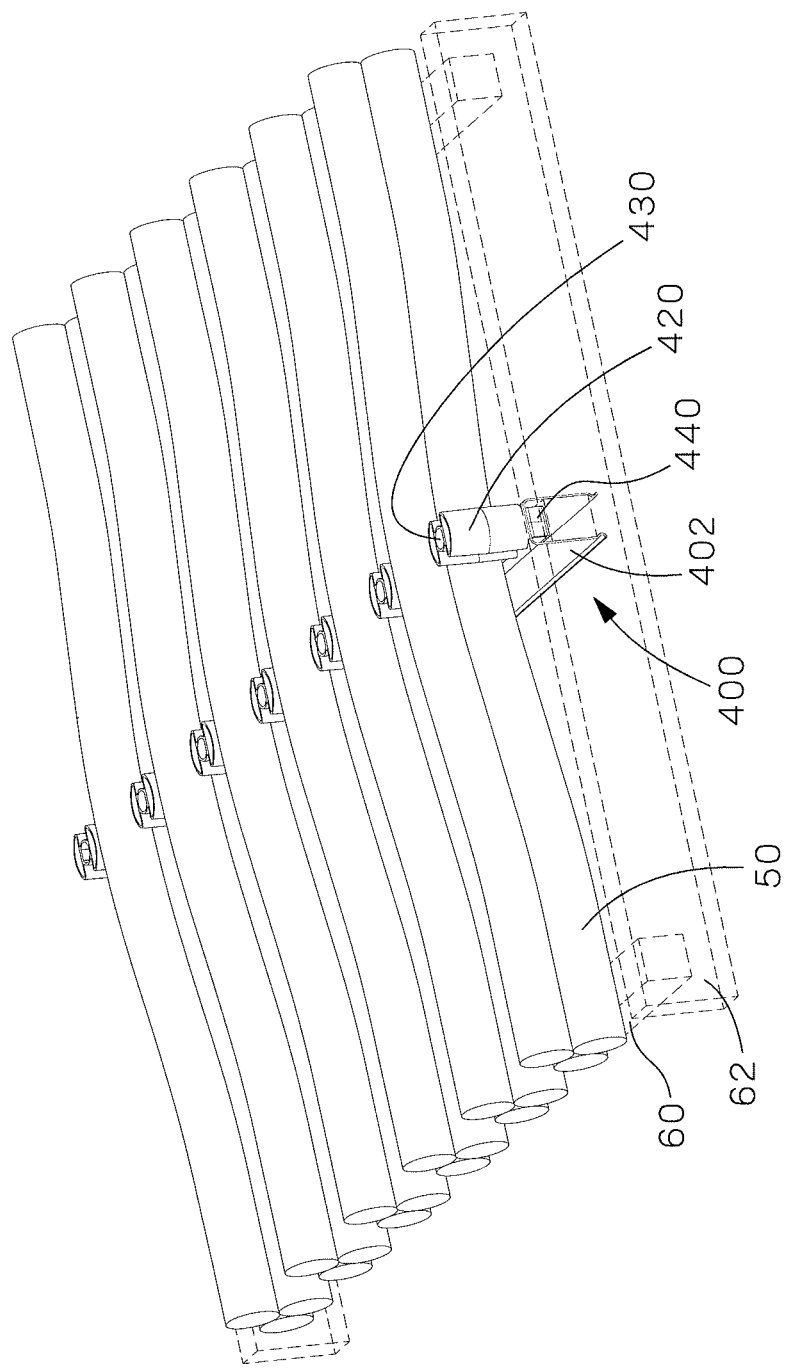
FIG. 37 is a perspective view of the thermal expansion cable divider of FIG. 32 installed on a ladder rung with the ladder side rail in phantom.
Figure 38:
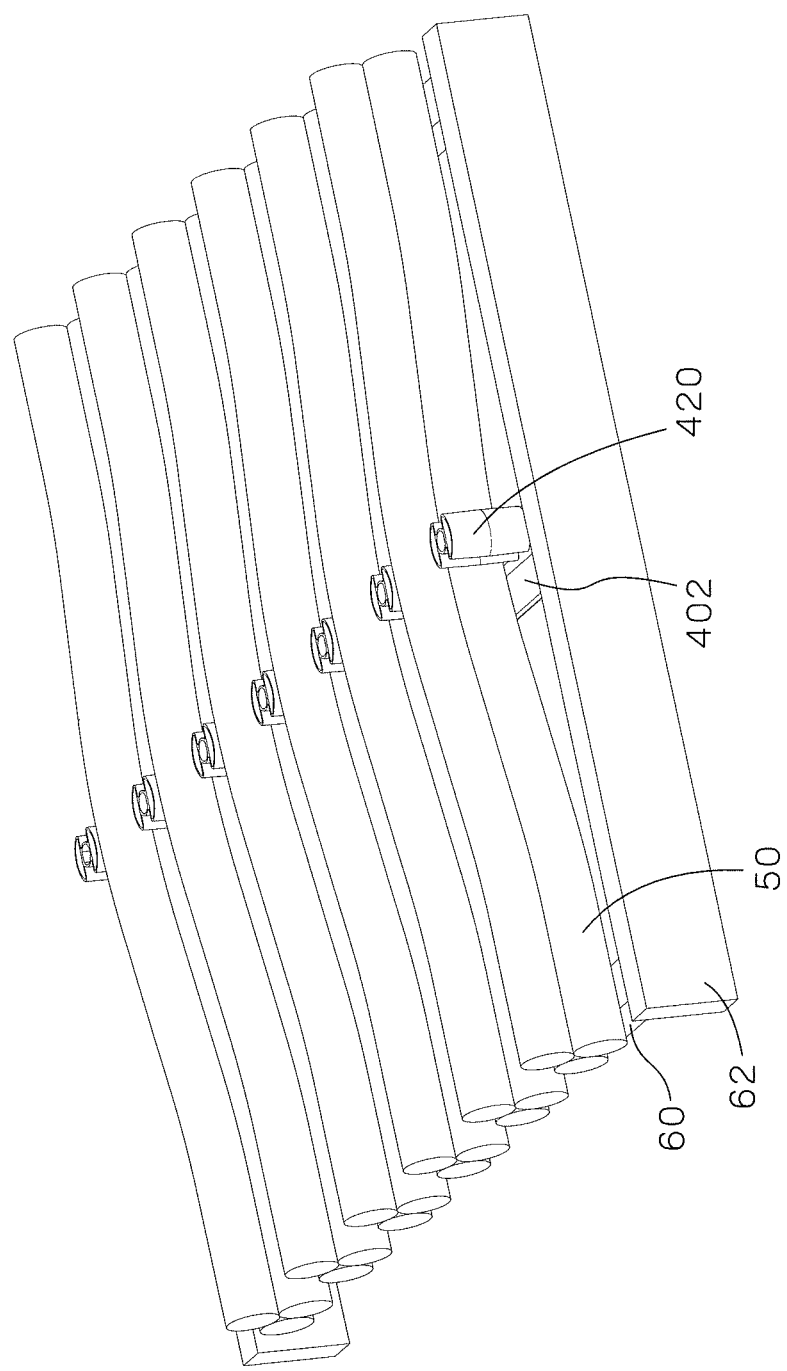
FIG. 38 is a perspective view of the thermal expansion cable divider of FIG. 37 installed on a ladder rung.
Figure 39:
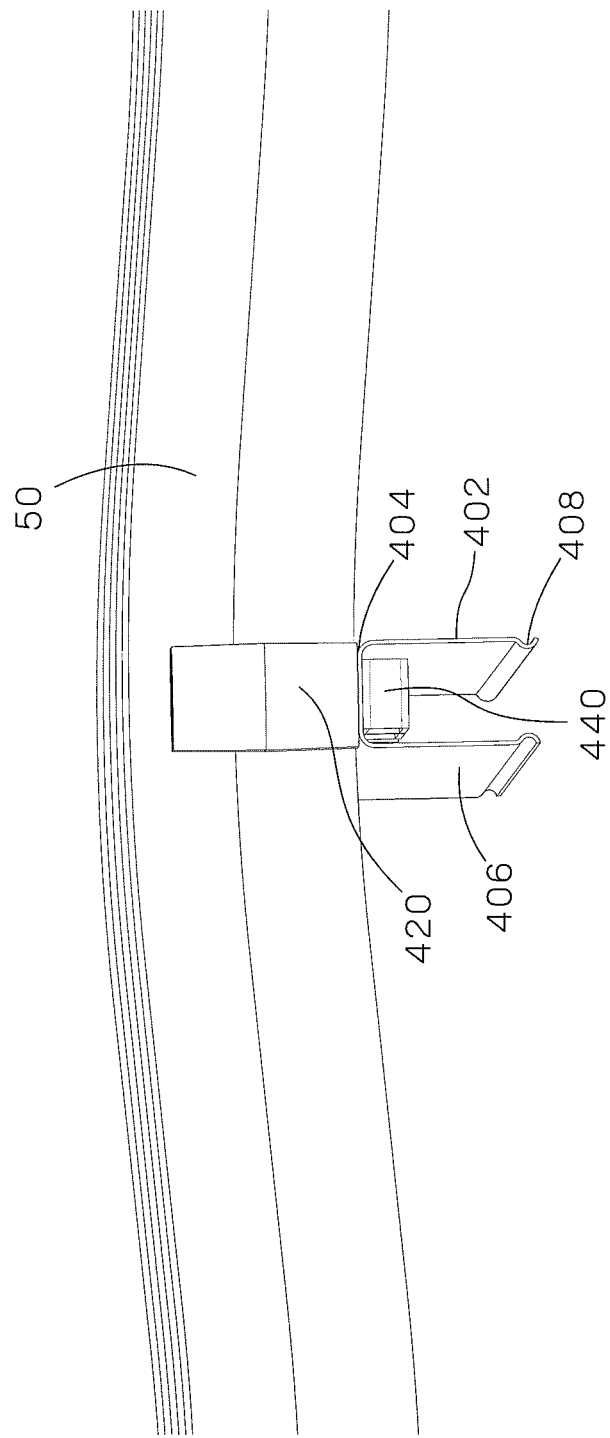
FIG. 39 is a front perspective view of the thermal expansion cable divider of FIG. 32 with a plurality of cables installed thereon.

The cable divider 400 helps control the thermal expansion of cables that are installed in a cable ladder rack system while maintaining the separation of cable bundles as they expand. As illustrated in FIGS. 37-39, a cable divider 400 is placed over a ladder rung 60 so that the cable path is slightly elevated above the ladder rungs 60 thereby creating a natural bend point to allow the cables to move during thermal expansion. The cable separation is maintained during this movement from thermal expansion by the divider spacing blocks which are taller than the cable diameter.

The thermal expansion cable divider can accommodate a variety of cable spacing via different sized spacers. The cable spacer segments are easy to install as is the divider bracket since no fasteners or tools are required.

Figure 40:
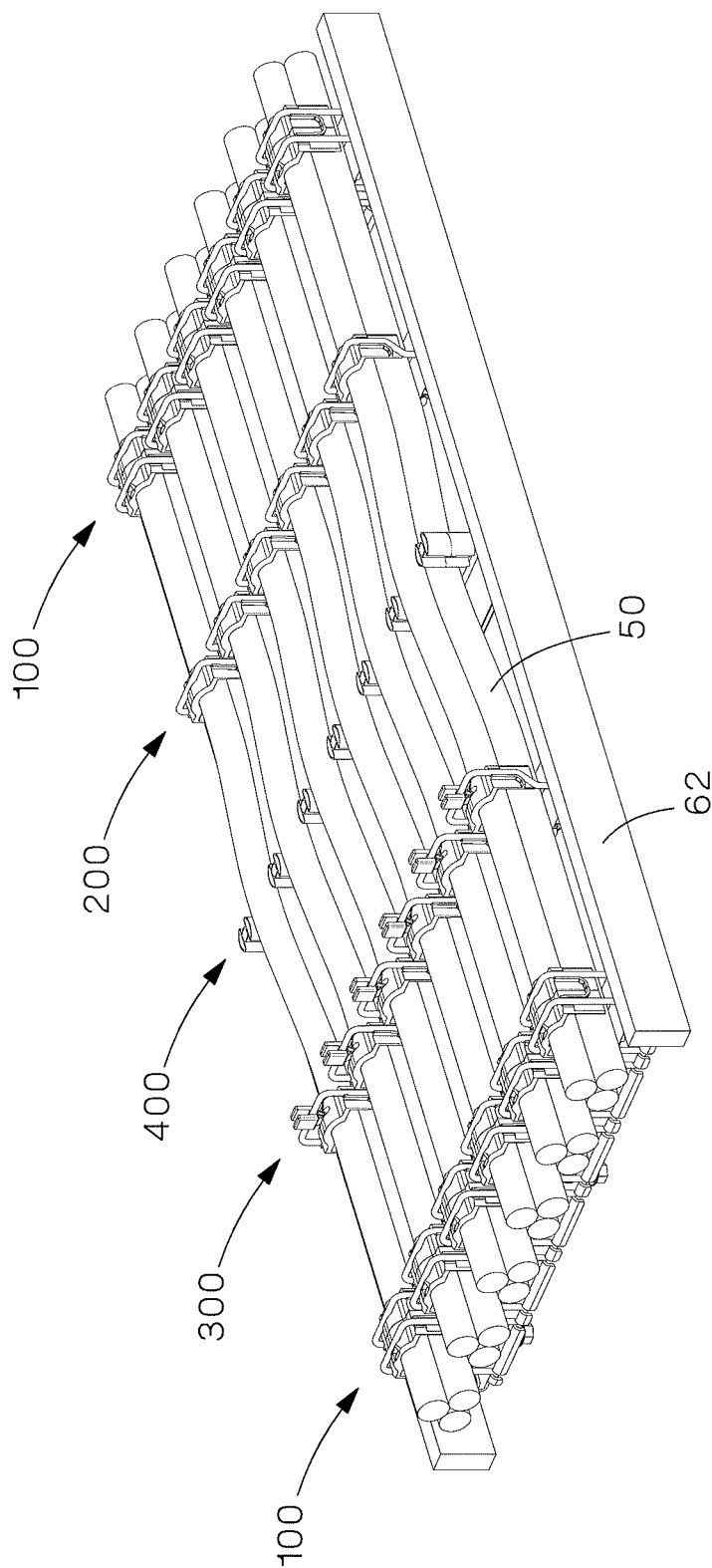
FIG. 40 is a perspective view of the thermal expansion cable grip, thermal expansion cable containment clamps, and the cable divider of the present invention installed on a ladder rack.

FIG. 40 illustrates the thermal expansion and contraction system with a plurality of cable bundles 50, the thermal expansion cable grip 100, the thermal expansion cable containment clamps 200 and 300, and the cable divider 400. When the system is assembled, the cable grip 100 prevents movement past its position and holds the cables to the ladder rungs. The cable containment clamps 200, 300 hold the cables to the ladder rungs and allow for movement of the cables in a vertical direction. The cable divider 400 is designed to be the point of least resistance for movement of the cables due to a pre-bent condition. The cable dividers 400 insure that the movement or expansion of the cables is in the correct direction. The cable dividers 400 also provide separation of the cables in the system. Thus, the cable grips 100, cable containment clamps 200, 300 and the cable divider 400 form a system that accommodates the thermal expansion and contraction of the cable bundles.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation.

The invention claimed is:

1. A thermal expansion and contraction system for securing cables to a ladder rung, the thermal expansion and contraction system comprising:
   at least one cable containment clamp secured to the ladder rung, wherein the cable containment clamp includes a protective grommet, a wire form and a spacer, whereby the at least one cable containment clamp holds the cables to the ladder rung while enabling movement in a vertical direction;
   wherein the wire form having two legs with parallel portions, angled offset portions, hook latches engaging the ladder rung for allowing the wire form to be installed on the ladder rung, and two distal ends; and
   at least one cable divider secured to the ladder rung for maintaining separation of cables in the thermal expansion and contraction system.

2. The thermal expansion and contraction system of claim 1, wherein the at least one cable divider is positioned over the ladder rung to create a slightly elevated cable path thereby creating a natural bend point to allow the cables to move during thermal expansion.

3. The thermal expansion and contraction system of claim 1, wherein the at least one cable divider having a C-shaped bracket with a main member, side members and curved ends; and wherein the at least one cable divider having a plurality of spacer mounts and cable spacers mounted to and extending from the C-shaped bracket.

4. The thermal expansion and contraction system of claim 3, wherein the cable spacers have a curved outer surface and an opening therethrough; wherein the spacer mounts are inserted through holes in the C-shaped bracket and mounted in the openings in the cable spacers.

5. The thermal expansion and contraction system of claim 3, wherein the spacer mounts are secured to elevation blocks, wherein the elevation blocks are positioned under the C-shaped bracket for elevating the cable divider when installed on the ladder rung.

6. The thermal expansion and contraction system of claim 1, wherein the protective grommet includes a top member with a channel for receiving the wire form and sides with projections defining a channel for receiving the wire form; and wherein the spacer having a rectangular body and stops, the stops secure the spacer to the wire form.

7. The thermal expansion and contraction system of claim 1, wherein the cable containment clamp further comprising a cam lever for installing the wire form over the protective grommet, wherein the cam lever including a center opening for receiving the wire form and a wedge shaped bottom for engaging a channel in a top of the protective grommet.

* * * * *